United States Patent
Nakahara

(10) Patent No.: US 9,710,204 B1
(45) Date of Patent: Jul. 18, 2017

(54) FAST DRAWING OF UNROTATED RUN-LENGTH ENCODED IMAGES

(71) Applicant: KYOCERA Document Solutions Inc., Osaka (JP)

(72) Inventor: Hideo Nakahara, Torrance, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/197,353

(22) Filed: Jun. 29, 2016

(51) Int. Cl.
*G06K 15/00* (2006.01)
*G06F 3/12* (2006.01)
*H04N 1/60* (2006.01)
*G06K 15/02* (2006.01)

(52) U.S. Cl.
CPC ........... *G06F 3/1215* (2013.01); *G06F 3/122* (2013.01); *G06F 3/1295* (2013.01); *G06K 15/1817* (2013.01); *G06K 15/1822* (2013.01); *H04N 1/6022* (2013.01)

(58) Field of Classification Search
None
See application file for complete search history.

(56) References Cited

U.S. PATENT DOCUMENTS

| 8,194,271 B2 | 6/2012 | Nakahara |
| 8,520,243 B2 | 8/2013 | Nakahara |
| 2006/0028701 A1 | 2/2006 | Suzuki |
| 2009/0103139 A1 | 4/2009 | Ozawa |
| 2013/0188200 A1 | 7/2013 | Nakahara |
| 2013/0286422 A1* | 10/2013 | Hirano ............... G06K 15/1872 358/1.13 |

FOREIGN PATENT DOCUMENTS

JP 2007026285 A 2/2007

OTHER PUBLICATIONS

Bai et al., U.S. Appl. No. 14/923,924, entitled "Method and System for Rendering Rectangle Drawing Objects Using One-Line Raster Image Data", filed Oct. 27, 2015.

* cited by examiner

Primary Examiner — Helen Q Zong
(74) Attorney, Agent, or Firm — McDonnell Boehnen Hulbert & Berghoff LLP

(57) ABSTRACT

Methods and apparatus for rendering images are provided. A computing device can receive a plurality of parts of an image, with the plurality of parts including a first particular part immediately preceding a second particular part. The plurality of parts can include first type parts and second type parts having a positive count value. The computing device can decode the plurality of parts by: generating a first node of the first type including color information of both first and second particular parts, if both first and second particular parts are first type parts; otherwise generating a second node of the second type with the matching color information and a sum of the first and second particular parts' count values, if first and second particular parts are second type parts and have matching color information. The computing device can render a line of the image based on the nodes.

20 Claims, 15 Drawing Sheets

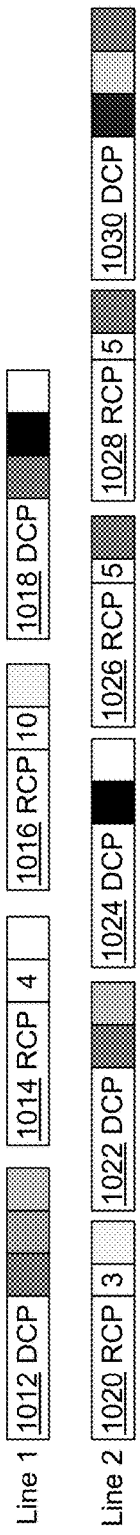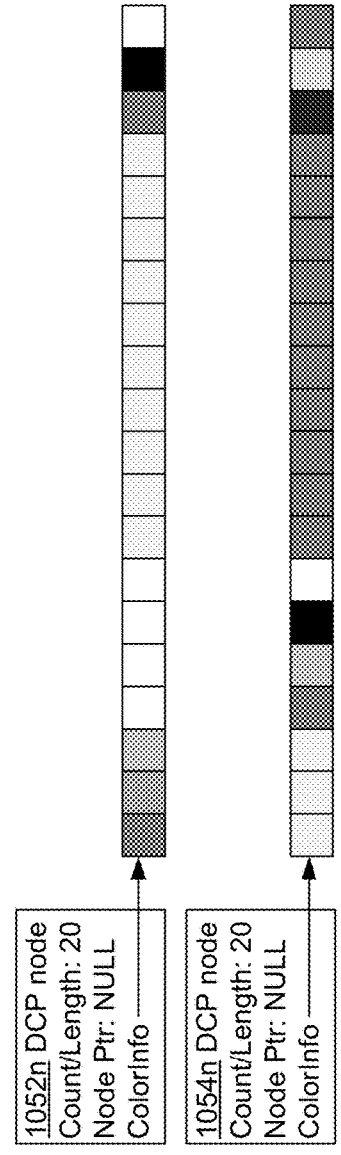

FAST DRAWING OF UNROTATED RUN-LENGTH ENCODED IMAGES

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server.

The networks can include many printing devices. Some or all of the printing devices can have different features, functions, and capabilities. For example, some printing devices print in color, while others do not. As another example, some printing devices are equipped with duplexing hardware that allows printing on both sides of a sheet of paper, while other printing devices can only print on one side of a sheet of paper.

Printing devices can print data, such as image data, that is encoded in one or more formats. Examples of these formats include Kyocera Page Description Language (KPDL), Printer Command Language (PCL), Portable Document Format (PDF), the generic Page Description Language (PDL), and PostScript. Other formats are possible as well.

SUMMARY

In one aspect, a method is provided. A computing device receives a plurality of parts of an image. The plurality of parts include one or more parts having a first type, and one or more parts having a second type, where the one or more parts having the second type each have a count value that is greater than one. The plurality of parts of the image include a first particular part and a second particular part, where the first particular part immediately precedes the second particular part in the plurality of parts. The computing device decodes the plurality of parts of the image into a plurality of nodes by at least: determining whether both the first particular part and the second particular part have the first type; after determining that both the first particular part and the second particular part have the first type, generating a first node of the first type that includes color information of the first particular part and color information of the second particular part; and after determining that both the first particular part and the second particular part do not have the first type: determining whether both the first particular part and the second particular part have the second type, after determining that both the first particular part and the second particular part do have the second type, determining whether color information of the first particular part matches color information of the second particular part, and after determining that the color information of the first particular part matches the color information of the second particular part, generating a second node of the second type that includes the color information of the first part and a count value that is based on a sum of the count value of the first particular part and the count value of the second particular part. The computing device renders at least one line of the image based on the color information of at least one node of the plurality of nodes.

In another aspect, a computing device is provided. The computing device includes one or more processors and data storage. The data storage is configured to store computer-readable instructions that, when executed by the one or more processors, cause the computing device to perform functions. The functions include: receiving a plurality of parts of an image, the plurality of parts including one or more parts having a first type and one or more parts having a second type, where the one or more parts having the second type each have a positive count value, where the plurality of parts of the image include a first particular part and a second particular part, and where the first particular part immediately precedes the second particular part in the plurality of parts; decoding the plurality of parts of the image into a plurality of nodes by at least: determining whether both the first particular part and the second particular part have the first type; after determining that both the first particular part and the second particular part have the first type, generating a first node of the first type that includes color information of the first particular part and color information of the second particular part; and after determining that the both the first particular part and the second particular part do not have the first type: determining whether both the first particular part and the second particular part have the second type, after determining that both the first particular part and the second particular part do have the second type, determining whether color information of the first particular part matches color information of the second particular part, and after determining that the color information of the first particular part matches the color information of the second particular part, generating a second node of the second type that includes the color information of the first part and a count value based on a sum of the count value of the first particular part and the count value of the second particular part; and rendering at least one line of the image based on the color information of at least one node of the plurality of nodes.

In another aspect, an article of manufacture is provided. The article of manufacture includes a non-transitory data storage that is configured to store at least computer-readable instructions. The computer-readable instructions, when executed by one or more processors of a computing device, cause the computing device to perform functions. The functions include: receiving a plurality of parts of an image, the plurality of parts including one or more parts having a first type and one or more parts having a second type, where the one or more parts having the second type each have a positive count value, where the plurality of parts of the image include a first particular part and a second particular part, and where the first particular part immediately precedes the second particular part in the plurality of parts; decoding the plurality of parts of the image into a plurality of nodes by at least: determining whether both the first particular part and the second particular part have the first type; after determining that both the first particular part and the second particular part have the first type, generating a first node of the first type that includes color information of the first particular part and color information of the second particular part; and after determining that both the first particular part and the second particular part do not have the first type: determining whether both the first particular part and the second particular part have the second type, after determining that both the first particular part and the second particular part do have the second type, determining whether color information of the first particular part matches color information of the second particular part, and after determining that the color information of the first particular part matches the color information of the second particular part, generating a second node of the second type that includes the color information of the first part and a count value based on a sum of the count value of the first particular part and the count value of the second particular part; and rendering at least one line of the image based on the color information of at least one node of the plurality of nodes.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 10B shows another run-length encoded image, according to an example embodiment.

FIG. 10C shows image nodes corresponding to the image of FIG. 10B, according to an example embodiment.

FIG. 10D shows a rendered image, according to an example embodiment.

DETAILED DESCRIPTION

Figure 1:
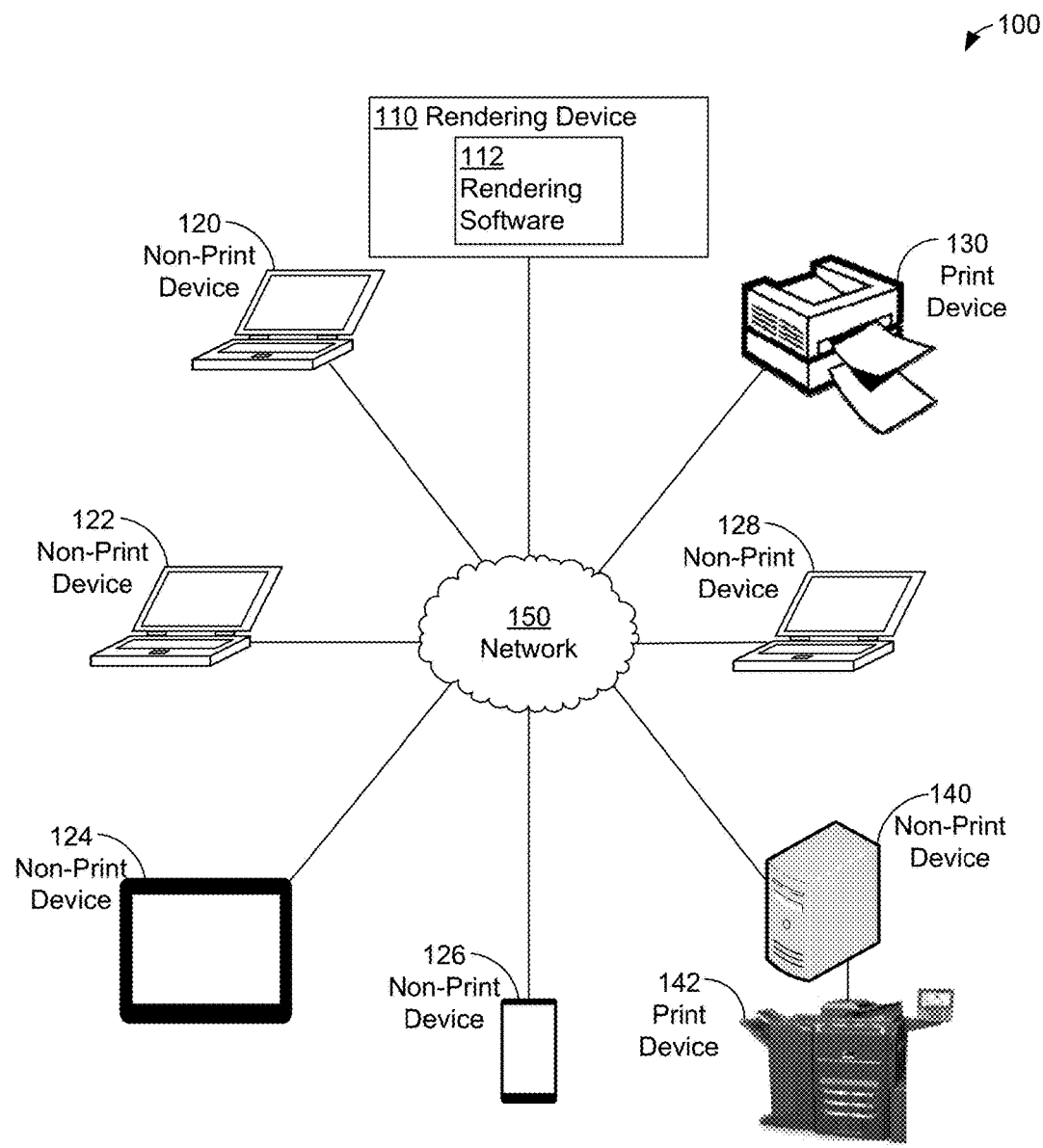
FIG. 1 is a diagram illustrating a printing network, according to an example embodiment.

Example apparatus and methods are described herein related to rendering images encoded using a run-length encoded (RLE) format. Run-length encoding is a form of data compression where a "run" or sequences of repeated data values are converted into a count (or length) and data value representation. In some examples, RLE can significantly reduce the size of the represented data. For example, the string "xxxxxx" can be represented as "6x", where "6" is the count/length of the run and the "x" is the repeated data value. In implementations where integers can be stored in two bytes and characters can be stored in one byte, six bytes of storage can be used to the six characters "xxxxxx", while only three bytes of storage can be used to store the "6x" representation, cutting the original storage requirement in half.

Many RLE-based different formats for compressing data, such as image data, can be used. Some RLE-based formats, such as the format used by AirPrint™-enabled printing devices, can compress both repeated lines of data using repeated line values and repeated characters, bytes, and/or pixels of data using RLE. Other example formats, such as a Split Run-Length Encoding (SRLE) format, can encode runs of matching and nearly matching data.

For example, a RLE-based format can use two or more types of image parts to encode an image. One type of image part can be a direct color part that stores color information for a group of one or more pixels. The color information for the direct color part can represent actual pixel values for each pixel in the group of pixels. For example a direct color part that represents a black pixel and a white pixel can store pixel data for the two pixels, such as greyscale or red-green-blue (RGB) values for the black pixel and the white pixel, as color information for the direct color part. Another type of image part can be a repeating color part that stores color information for one pixel and a count representing a number of pixels that utilize the color information. For example, a repeating image part with color information for a blue pixel and a count of 10 can represent a group of 10 blue pixels. Many other types of image parts and/or RLE-based formats are possible as well.

To print images encoded using such an RLE format, a printing device can save a print job for a page as one or more intermediate nodes, and then render the nodes as an image; e.g., as an array of pixels or an array of bits representing the image. The nodes can correspond to image parts of the RLE-encoded image. To accelerate conversion of run-length encoded image data, a printing device can use one or more merging techniques to merge some of the intermediate nodes. One merging technique is to join a first node representing a first direct color part with a following second direct color part node that is on the same horizontal line of the image as the first direct color part. For example, suppose that as part of one horizontal line of an RLE-encoded image, mage part IPA follows image part IPB in succession, where image part IPA is a direct color part encoding two pixels: a blue pixel followed by a green pixel, and where image part IPB is a direct color part encoding three pixels: a red pixel followed by a cyan pixel that in turn is followed by a magenta pixel. Then, one merged node MN1 representing both image parts IPA and IPB can be used, where MN1 represents a direct color part for five pixels that are (in order): a blue pixel, a green pixel, a red pixel, a cyan pixel, and a magenta pixel.

As another example merging technique can include joining a node representing a first repeating color part with a following node representing a second repeating color part, where both repeating color parts are for the same horizontal line of the image, and where both repeated color parts have the same color information. For example, suppose that as part of one horizontal line of an RLE-encoded image, mage part IPC follows image part IPD in succession, where image part IPC is a repeating color part representing three blue pixels and where image part IPD is a repeating color part representing seven blue pixels, where the blue pixels have the same representation (e.g., both pixels can have RGB values of {0, 0, 255}). Then, one merged node MN2 representing both image parts IPC and IPD can be used, where MN2 is a node representing a repeating color part for ten blue pixels.

Another example merging technique can involve the use of run averaging. Run averaging can involve determining an average length of repeated color parts for each line of an input image. For example, suppose a particular line of an input image is represented by five color parts: a direct color part representing two pixels, a repeating color part representing seven pixels, a direct color part representing three pixels, a repeating color part representing three pixels, and a repeating color part representing five pixels. In the particular line, three repeating color parts are used with respective lengths of 7, 3, and 5, leading to an average length of (7+3+5)/3=15/3=5.

If the average length for the particular line is less than a threshold value, then image parts of a line immediately subsequent to the particular line can be merged into one node representing a direct color part. Continuing the above example, suppose the threshold value is 8. Since the average length for the particular line is 5, the line subsequent to the particular line can be represented by a node representing a direct color part. For example, suppose the line subsequent to the particular line is represented by three image parts: a direct color part representing a blue pixel and a green pixel, a repeating color part representing 15 red pixels, and a direct color part representing a black pixel, a white pixel, and a grey pixel. Then, the line subsequent to the particular line can be represented as a node for a direct color part representing twenty pixels: a blue pixel, a green pixel, fifteen red pixels, a black pixel, a white pixel, and a grey pixel. Note that the next line (that is, the line subsequent to the line subsequent to the particular line) may be represented using multiple nodes since the average length of the line subsequent to the particular line is 15/1=15 which exceeds the threshold value of 8. Other example merging techniques are possible as well.

Some of the example apparatus and methods described herein are related to color conversion. Color conversion can involve transforming one or more input pixel values representing one or more pixels using an input color space into corresponding one or more output pixel values represented one or more pixels using an output color space. A color space can be a mathematical representation describing how one or more colors can be represented using one or more values per color. For example, a greyscale color space using values from 0 to 255 can assign the value 0 to a black color, the value 255 to a white color, and values between 0 and 255 to increasingly lighter shades of grey. Example color spaces include, but are not limited to, greyscale, RGB, cyan-magenta-yellow-black (CMYK), and hue-saturation-value (HSV) color spaces. Many color conversion techniques are known in the art.

By using merging techniques to merge nodes, decoding of run-length encoded images into image nodes and subsequent rendering of images based on the image nodes can be sped up, since fewer nodes have to be processed after some nodes have been merged. In some cases, the amount of memory used to store nodes can be reduced since fewer image nodes are used after merging has taken place. Thus, merging techniques can be used to increase speed and decrease memory usage during encoding and rendering of run-length encoded images.

Example Printing Systems

FIG. 1 is a diagram illustrating printing network 100, according to an example embodiment. Printing network 100 includes rendering device 110, one or more non-printing devices 120, 122, 124, 126, 128, 140 and one or more printing devices (PDs) 130, 142 interconnected using network 150. In some examples, printing network 100 can have more, fewer, and/or different types of assessment devices, non-printing devices, and/or printing devices than indicated in FIG. 1.

Rendering device 110 and/or non-printing devices 120, 122, 124, 126, 128 can be or include computing devices configured to communicate with each other and with printing devices 130, 142 using network 150. Rendering device 110 can be a printing or non-printing device that includes rendering software 112. Rendering software 112 can receive images, documents, and/or files to be displayed and/or printed and generate rendered output based on the image and/or textual data, wherein the rendered output is suitable for display and/or printing by rendering device.

Printing devices 130, 142 can include devices configured to scan, print, copy, e-mail, account, communicate, and/or otherwise process images, documents, and/or files that are originally available either on paper or electronically. In printing network 100, a non-printing device can be a computing device that is not a printing device, where the non-printing device can be configured to communicate with other non-printing devices and with printing devices 130, 142 using network 150. In particular, a non-printing device typically does not print images, documents, and/or files to paper and typically does not scan images, documents, and/or files from paper, while printing devices typically do print images, documents, and/or files to paper and typically do scan images, documents, and/or files from paper.

After processing by one or more of printing devices 130, 142, the images, documents, and/or files can be subsequently available either on paper or electronically, as requested. That is, printing devices 130, 142 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 130, 142 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 130, 142 can perform other tasks and/or other processing as well. Printing devices 130, 142 can include products from various manufacturers with variations in color, speed, computing power, functionality, network connectivity, and/or other features.

In an example embodiment, some or all printing devices 130, 142 can be connected to network 150 through one or more, possibly different, network protocols. Data can be transmitted between printing devices 130, 142, non-printing devices 120, 122, 124, 126, 128, 140 over wired and/or wireless links between non-printing devices, printing devices, and network 150. The format of each respective data transmission between devices in printing network 100 can include one or more of a variety of different formats including: text formats, image formats, extensible mark-up language (XML), database tables, a flat file format, or another format. In some embodiments, a non-printing device can be configured to act as a print server for one or more printing devices. A print server can be configured to process jobs (e.g., spool job-related data, route jobs, provide user and/or server-related accounting for jobs, verify/enforce authentication and authorization rules related to jobs) and store data related to printing devices in printing network 100. For example, in network 150, non-printing device 140 is configured to be a print server for at least printing device 142.

Communications between the non-printing devices, and printing devices can include: rendering device 110 and/or non-printing devices 120, 122, 124, 126, 128, 140 sending data for print jobs and/or print job portions for printing to printing devices 130, 142 and printing devices 130, 142 sending alert, status, error, and/or other messages to inform other devices about error or other conditions of the printing devices; e.g., idle, printing, sleeping, paper jam, low or out of paper, low or out of toner/ink, etc. Other communications between one or more rendering devices, one or more non-printing devices, and one or more printing devices are possible as well; e.g., the communications described below related to rendering software 112.

Example Computing Devices

Figure 2:
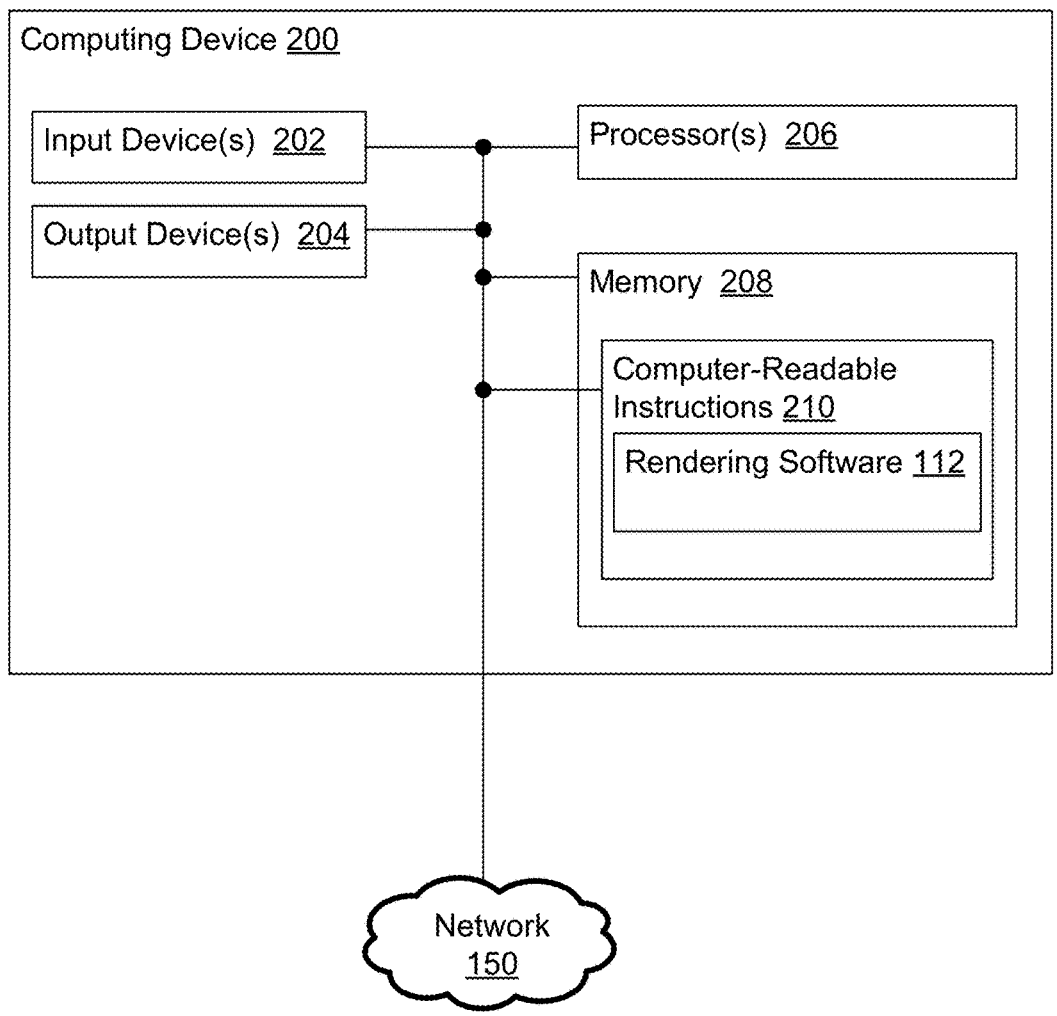
FIG. 2 is a schematic block diagram illustrating a computing device, according to an example embodiment.

FIG. 2 is a schematic block diagram illustrating computing device 200, according to an example embodiment. In some embodiments, computing device 200 can be configured to perform one or more herein-described functions of: printing network 100, rendering device 110, non-printing devices 120, 122, 124, 126, 128, 140, printing devices 130, 142, methods 300, 400, 500, 600, 700, 800, 900, and 1200, rendering software 112 including but not limited to functionality of decoder 450 and renderer 460.

Computing device 200 can include one or more input devices 202, one or more output devices 204, one or more processors 206 and memory 208. Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 150, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 150. Sensors can include devices configured to measure conditions in an environment of computing device 200 and provide data about that environment, such data including, but not limited to, location data, velocity (speed, direction) data, acceleration data, and other data about the environment for computing device 200. Example sensors include, but are not limited to, GPS sensor(s), location sensors(s), gyroscope(s), accelerometer(s), magnetometer(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 150, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 150. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 206 can be configured to execute computer-readable program instructions 210 that are contained in memory 208 and/or other instructions as described herein.

Memory 208 can include non-transitory machine-readable storage configured to store data and/or instructions. In particular, memory 208 can store machine-readable instructions 210 that, when executed by processor(s) 206, can cause a computing device to perform functions, such as but not limited to, functions of herein-described software, devices, networks, methods, features, and scenarios.

Example Techniques for Accelerated Rendering of RLE Encoded Images

Figure 3:
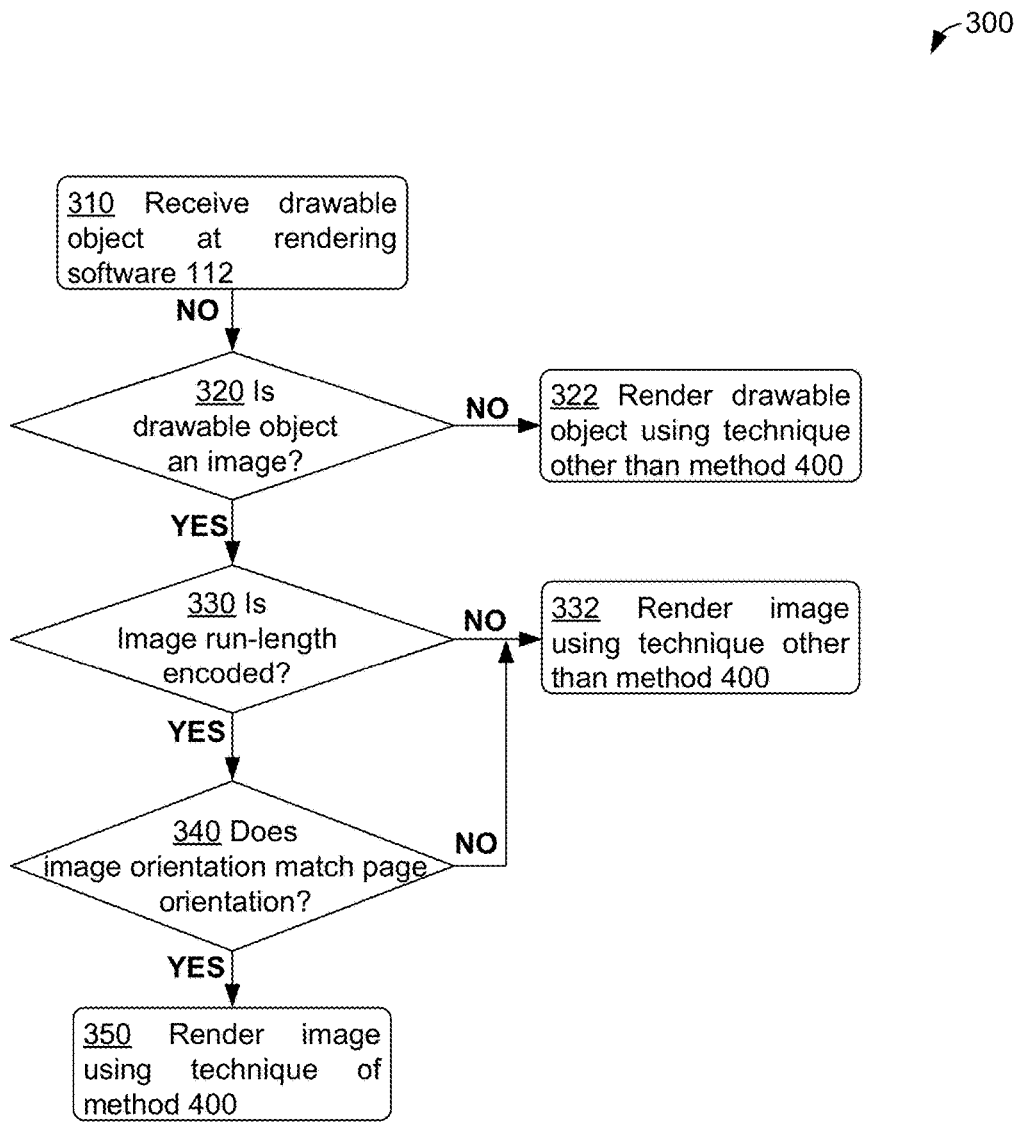
FIG. 3 is a flowchart for a method, according to an example embodiment.

FIG. 3 is a flowchart for method 300, according to an example embodiment. Method 300 can be used to determine whether an optimized method for rendering run-length encoded images, herein-described as method 400, can be utilized to render a drawable object received as an input. Method 300 can be executed by a rendering device executing rendering software, such as rendering device 110 executing rendering software 112. Method 300 can begin at block 310, where rendering device 110 (and/or rendering software 112) can receive the drawable object, which can be an image or another type of drawable object (e.g., a document, text, or other non-image object that can be rendered, displayed, and/or printed).

At block 320, the rendering device (and/or rendering software) can determine whether the drawable object is an image. For example, the rendering device can inspect a format, file name, file extension, and/or other properties of the drawable object to determine whether or not the drawable object is an image. If the rendering device determines that the drawable object is an image, method 300 can proceed to block 330. Otherwise, the rendering device determines that the drawable object is not an image and method 300 can proceed to block 322.

At block 322, the rendering device (and/or rendering software) can render the drawable object using a technique for rendering non-image drawable objects; in particular, a technique other than method 400. In some embodiments, once the non-image drawable object has been rendered at block 322, method 300 can end.

At block 330, the rendering device (and/or rendering software) can determine whether the image is a run-length encoded. For example, the rendering device can inspect a format, file name, file extension, and/or other properties of the image to determine whether or not the image is run-length encoded. If the rendering device determines that the image is run-length encoded, method 300 can proceed to block 340. Otherwise, the rendering device determines that the drawable object is not an image and method 300 can proceed to block 332.

At block 332, the rendering device (and/or rendering software) can render the image using a technique for rendering non-run-length encoded images; in particular, a technique other than method 400. In some embodiments, once the image has been rendered at block 332, method 300 can end.

At block 340, the rendering device (and/or rendering software) can determine whether the run-length encoded image has an image orientation that matches a page orientation of the run-length encoded image. For example, the rendering device can inspect the page orientation and the image orientation of the run-length encoded image to determine whether or not the page and image orientations match. If the rendering device determines that run-length encoded image has matching page and image orientations, method 300 can proceed to block 350. Otherwise, the rendering device determines that the run-length encoded image does not have matching page and image orientations and method 300 can proceed to block 342.

At block 342, the rendering device (and/or rendering software) can render the run-length encoded image using a technique for rendering run-length encoded images whose page and image orientations differ; in particular, a technique other than method 400. In some embodiments, once the image has been rendered at block 342, method 300 can end.

At block 350, the rendering device (and/or rendering software) can render the run-length encoded image whose page and image orientations match using method 400. In some embodiments, once the image has been rendered at block 350, method 300 can end.

Figure 4A:
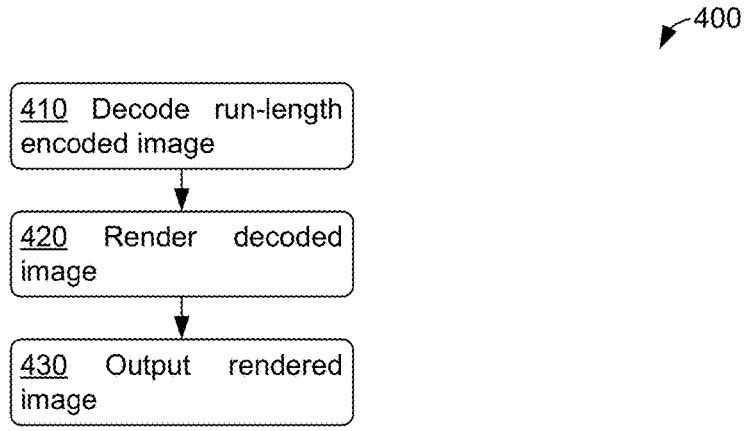
FIG. 4A is a flowchart for another method, according to an example embodiment.

FIG. 4A is a flowchart for method 400, according to an example embodiment. Method 400 can be utilized to rapidly render a run-length encoded image whose page and image orientations match. Method 400 can be executed by a rendering device executing rendering software, such as rendering device 110 executing rendering software 112. Method 400 can begin at block 410, where rendering device 110 (and/or rendering software 112) can decode the run-length encoded image into a decoded image that includes one or more rows of pixels.

At block 420, rendering device 110 (and/or rendering software 112) can render the decoded image.

At block 430, rendering device 110 (and/or rendering software 112) can output the rendered image. For example, the rendered image can be output as paper, a file, a display, a stream of data, and/or as some other output(s) of rendering device 110 (and/or rendering software 112). In some embodiments, once the rendered image has been output at block 430, method 400 can end.

Figure 4B:
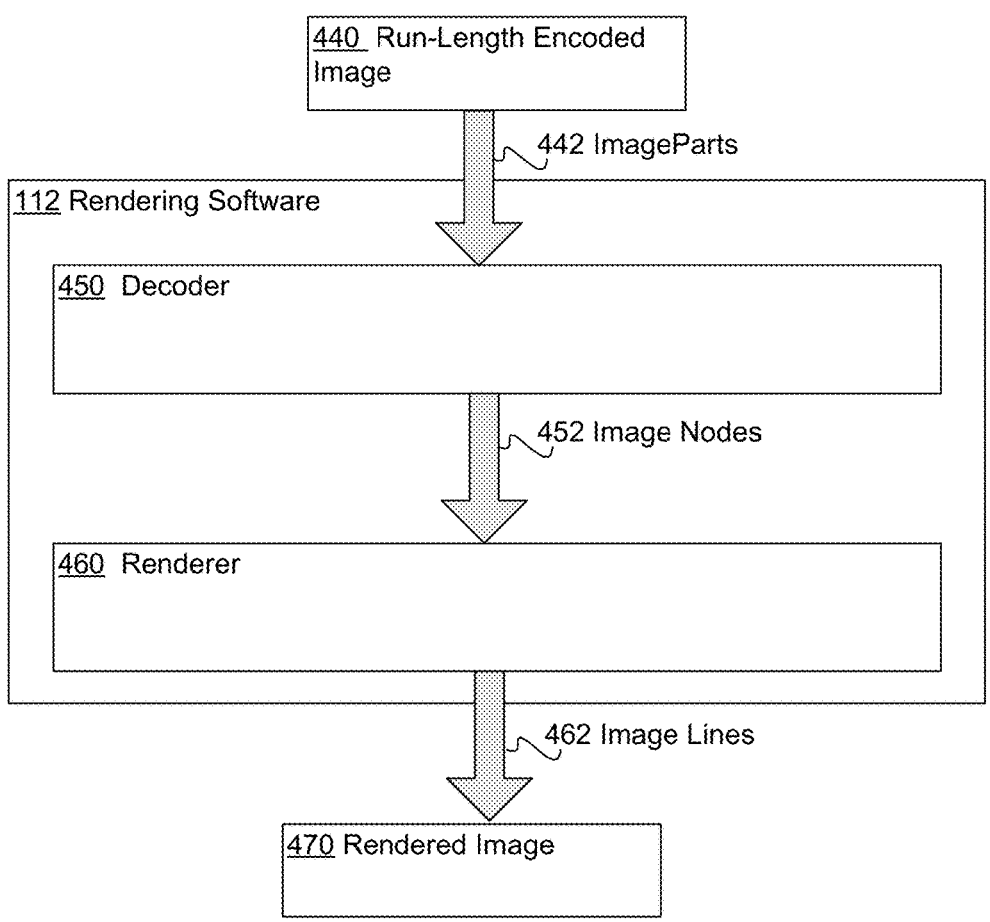
FIG. 4B is a block diagram of rendering software, according to an example embodiment.

FIG. 4B is a block diagram of rendering software 112, according to an example embodiment. Rendering software 112 can implement at least method 400. For example, FIG. 4B shows that rendering software 112 receives run-length encoded image 440 as an input. As indicated above in the context of method 300, run-length encoded image 440 can be a run-length encoded image whose page and image orientations match so that method 400 can be utilized.

Run-length encoded image 440, as input, can include one or more image parts 442. The image parts can include direct color parts and repeated color parts. A direct color part can indicate a specific group of two or more different pixels. A repeated color part can represent a single pixel that is repeated C times, where C is a count value that is greater than zero, and where the repeated color part stores the repeated pixel value as color information. Other image parts are possible as well in image 440.

Image parts 442 are provided as an input to decoder 450, which converts (or decodes) the image parts into one or more image nodes 452. An image node can represent one or more image parts, and so can store color information and one or more count values corresponding to the image part(s). Image nodes 452 are provided to renderer 460 which generates (or renders) one or more image lines 462 of an image that is specified by image nodes 452. After renderer 460 has generated all of image lines 462 for the image, rendered image 470 can be output. In some embodiments, renderer 460 can output rendered image 470 on an image-line by image-line basis rather than awaiting completion of the rendering of rendered image 470 before generating an output.

Figure 4C:
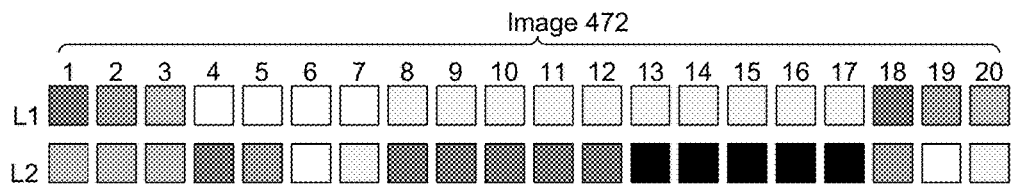
FIG. 4C shows two lines of pixels of an image, according to an example embodiment.
Figure 4D:
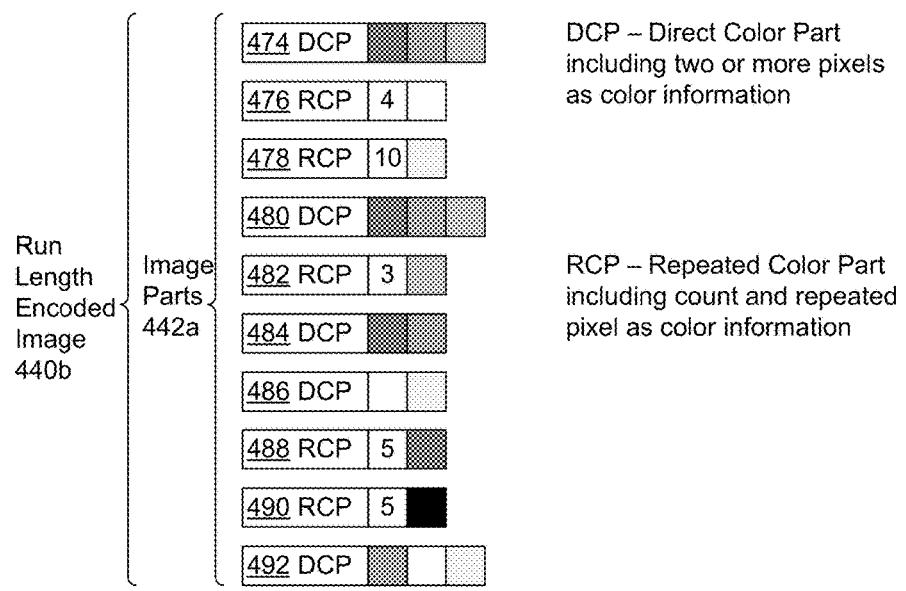
FIG. 4D shows image parts of a run-length encoded copy of the two lines of pixels illustrated in FIG. 4C, according to an example embodiment.
Figure 4E:
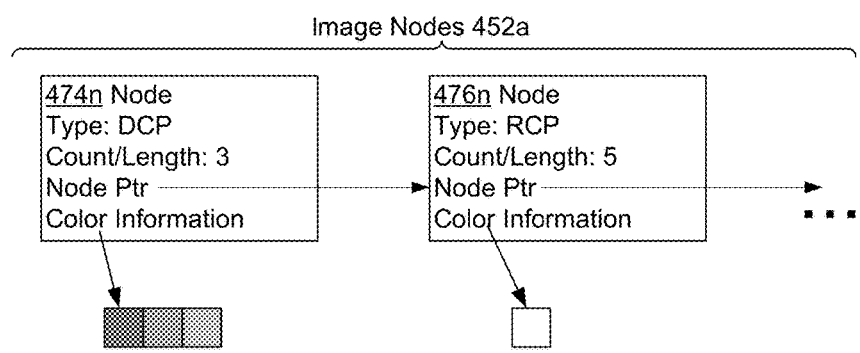
FIG. 4E shows two image nodes related to the image part of FIG. 4D, according to an example embodiment.

FIGS. 4C, 4D, and 4E illustrate respective examples of an image, image parts, and image nodes discussed above in the context of rendering software 112 and FIG. 4B. FIG. 4C. FIG. 4C shows two lines of pixels of image 440a, according to an example embodiment. In some examples, image 440a can be input to rendering software 112; i.e., image 440a can be an example of image 440 of FIG. 4B.

Image 440a includes two lines (rows) of twenty pixels, for a total of forty pixels. Each line of image 440a can be considered to have twenty columns, each column representing one pixel. FIG. 4C shows line 1 of image 440a labeled as "L1" and line 2 of image 440a labeled as "L2". Image 440a is shown as a grey-scale image, while in other examples, an image can include color pixels (e.g., a pixel can have data for respective RGB, CMYK, HSV, or another color representation). In some embodiments, a greyscale pixel can be represented as an 8-bit/1 byte value ranging from 0 (black) to 255 (white). Using such this 8-bit representation, Table 1 below shows grey-scale pixel values for image 440a. In Table 1, "C1" stands for Column 1, "C2" stands for Column 2, and so on, until reaching "C20" for column 20.

TABLE 1

| Column | Line L1 | L1 Color Part | Line L2 | Line L2 Color Part |
|--------|---------|---------------|---------|--------------------|
| C1 | 127 | DCP 474 | 191 | RCP 482 |
| C2 | 165 | DCP 474 | 191 | RCP 482 |
| C3 | 191 | DCP 474 | 191 | RCP 482 |
| C4 | 255 | RCP 476 | 127 | DCP 484 |
| C5 | 255 | RCP 476 | 165 | DCP 484 |
| C6 | 255 | RCP 476 | 255 | DCP 486 |
| C7 | 255 | RCP 476 | 242 | DCP 486 |
| C8 | 242 | RCP 478 | 127 | RCP 488 |

TABLE 1-continued

| Column | Line L1 | L1 Color Part | Line L2 | Line L2 Color Part |
|---|---|---|---|---|
| C9  | 242 | RCP 478 | 127 | RCP 488 |
| C10 | 242 | RCP 478 | 127 | RCP 488 |
| C11 | 242 | RCP 478 | 127 | RCP 488 |
| C12 | 242 | RCP 478 | 127 | RCP 488 |
| C13 | 242 | RCP 478 | 0   | RCP 490 |
| C14 | 242 | RCP 478 | 0   | RCP 490 |
| C15 | 242 | RCP 478 | 0   | RCP 490 |
| C16 | 242 | RCP 478 | 0   | RCP 490 |
| C17 | 242 | RCP 478 | 0   | RCP 490 |
| C18 | 127 | DCP 480 | 165 | DCP 492 |
| C19 | 165 | DCP 480 | 255 | DCP 492 |
| C20 | 191 | DCP 480 | 242 | DCP 492 |

FIG. 4D shows image parts 442a of a run-length encoded example of image 440a, according to an example embodiment. In some examples, image parts 442a can be input to decoder 450 of rendering software 112; i.e., image parts 442a can be an example of image parts 442 of FIG. 4B. Collectively, image parts 442a can make up a run-length encoded image, such as run-length encoded image 440b as shown in FIG. 4D.

Two image parts can be termed as adjacent image parts if one image part of the two image parts directly follows the other image part as encoded for an image; for example, direct color part 474 and repeating color part 476 are adjacent image parts, since repeating color part 476 directly follows direct color part 474 as encoded for run-length encoded image 440b. Similarly, repeating color part 476 and repeating color part 478 are adjacent image parts. Many other examples of adjacent image parts are possible as well.

Image parts 442a can include image parts 474, 476, 478, 480, 482, 484, 486, 488, 490, and 492. Image parts 442a can represent run-length encoded image 440b using two types of image parts: direct color parts (DCPs) and repeated color parts (RCPs). FIG. 4D and Table 1 show that image part 474 of image parts 442a is a direct color part representing the pixels in columns 1, 2, and 3 of line 1 of image 440a; that is, the color information of image part 474 includes pixel data for greyscale pixels having values of 127, 165, and 191. FIG. 4D and Table 1 Image part 476 of image parts 442a is a repeated color part representing the four pixels in columns 4-7 of line 1 of image 440a. FIG. 4D and Table 1 also show the remainder of image 440a represented by image parts 478, 480, 482, 484, 486, 488, 490, and 492.

FIG. 4E shows image nodes 452a related to image parts 442a according to an example embodiment. In some examples, image nodes 452a can be input to renderer 460 of rendering software 112; i.e., image nodes 452a can be an example of image nodes 452 of FIG. 4B. Image nodes 452a include nodes 474n and 476n, where node 474n corresponds to image part 474, and where node 476n corresponds to image part 476.

Each of image nodes 474n and 476n include a type field, a count/length field, a node pointer, and a color information pointer. The type field of an image node can indicate a type of node; e.g., a direct color part/DCP node or a repeated color part/RCP node. For examples, node 474n is a DCP node and node 476n is an RCP node. The count/length field can indicate either a count of repeated pixels for RCP nodes, such as the count of 4 for node 476n, or a length of color information stored for DCP nodes, such as length of 3 for node 474n. The count/length field should be store a value that is greater than zero. Note that a count for an RCP node should be greater than one otherwise no pixels are repeated, and that a DCP node should have a count of one or more indicating a one or more pixels are represented by the DCP node.

The node pointer field can point to a next node in a line of pixels. For examples, the node pointer for node 474n points to node 476n, which follows node 474n in line L1 of image 440; that is, node 474n corresponds to image part 474 and represents columns 1-3 of line L1 of image 440, and node 476n corresponds to image part and represents columns 4-7 of line L1, which follow columns 1-3 of line L1. The node pointer for node 476n points can point to a RCP node corresponding to image part 478 (node not shown in FIG. 4E) that represents columns 8-17 of line L1 of image 440.

The color information pointer for an image node can point to data for one or more pixels represented by the image node, such as color data or greyscale data for the pixel(s) represented by the node. For example, the color information pointer for DCP node 474n points to image data for the three pixels represented by the node; if the image data for DCP node 474n was represented by greyscale data such as indicated in Table 1, then the image data for DCP node 474n can be 127, 165, and 191. Also, if the image data for RCP node 476n was represented by greyscale data such as indicated in Table 1, the image data for RCP node 476n can be 255, which is the greyscale value of a repeated pixel represented by the RCP node. In other embodiments, more, less, and/or different fields (including pointers) can be in an image node. In particular embodiments, the count and length field can be implemented as two separate fields rather than one field as shown in FIG. 4E.

Figure 5:
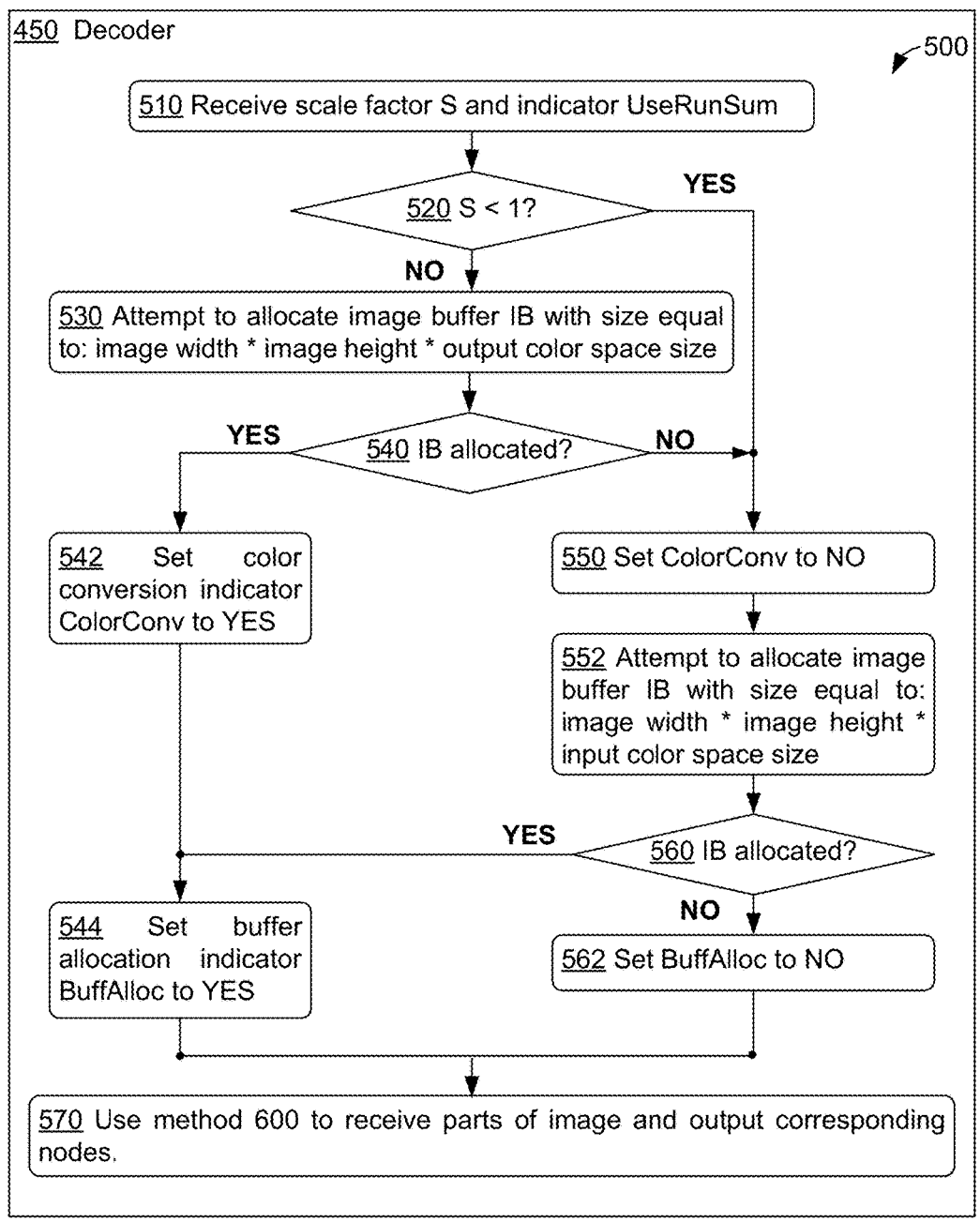
FIG. 5 shows a flowchart of a method executable by a decoder, according to an example embodiment.

FIG. 5 shows a flowchart of a method 500 executable by decoder 450, according to an example embodiment. Method 500 can be used to set indicators and allocate memory for decoding a run-length encoded image, such as run-length encoded image 440b of FIG. 4D. In some embodiments, method 500 can be utilized as an implementation of block 410 of method 400; that is, method 500 can be used to decode a run-length encoded image whose page and image orientations match.

Method 500 can begin at block 510, where decoder 450 can receive two inputs: a scale factor S and an indicator UseRunAvg. Scale factor S can be a non-negative value indicating a ratio between a size of an input image for decoder 450 to a size of an output image that is output by decoder 450, where the size of the output image is S times the size of the input image. For example, if an image input to decoder 450 is 100×50 pixels (that is, 100 lines, each having 50 columns of pixels) and S=0.5, then the image output by decoder 450 should be 50×25 pixels. As another example, if an image input to decoder 450 is 100×50 pixels and S=2.0, then the image output by decoder 450 should be 200×100 pixels.

Indicator UseRunAvg can be a binary valued indicator that is set to YES if run averaging is to be used or set to NO if run averaging is not to be used. Run averaging is discussed in more detail below in the context of methods 600, 700, and 800.

At block 520, decoder 450 can determine whether scale factor S is less than 1. If scale factor S is less than 1, decoder 450 can proceed to block 550; otherwise, decoder 450 can proceed to block 530.

At block 530, decoder 450 can attempt to allocate an input buffer IB having a size of image width*image size*output color space size. The output color space size can be expressed in terms of bytes, bits, pixels, or other convenient units. For example, using bytes for output color space size values, if the output color space is greyscale, then the output color space size can be 1 (since 1 byte of 8 bits can be used to represent 1 greyscale pixel), if the output color space is RGB or HSV, then the output color space size can be 3 (since 3 bytes of 8 bits can be used to represent 1 RGB or HSV pixel), and if the output color space is CYMK, then the output color space size can be 4 (since 4 bytes of 8 bits can be used to represent 1 CYMK pixel). Other output color space sizes can be used as well or instead.

As an example, for an image of size 100 rows×200 columns using a output CYMK color space, then the image height=100, the image width=200, the output color space size=4, and the image buffer IB can be attempted to be allocated with a size of 100*200*4=80,000 bytes. Many other examples are possible as well.

At block 540, decoder 450 can determine whether input buffer IB was successfully allocated. For example, a function, method, or other software entity used to allocated memory for IB can provide an indication whether or not IB was successfully allocated. If IB was successfully allocated, decoder 450 can proceed to block 542; otherwise, IB was not successfully allocated and decoder 450 can proceed to block 550.

At block 542, decoder 450 can set a color conversion indicator ColorConv to a YES value. The color conversion indicator ColorConv can indicate whether or not decoder 450 performs color conversion as part of inputting and decoding an input image. That is, if ColorConv is YES, decoder 450 does perform this color conversion, while if ColorConv is NO, decoder 450 does not perform color conversion, and so renderer 460 can perform color conversion instead of decoder 450.

At block 544, decoder 450 can set a buffer allocation indicator BuffAlloc to a YES value. The buffer allocation indicator BuffAlloc can be set to YES if an input buffer IB is successfully allocated for use by decoder 450, or set to NO if input buffer IB was not successfully allocated, and so memory for input buffer IB has to be otherwise obtained; e.g., obtained from a system heap or use of another memory allocation technique. Upon completion of block 544, decoder 450 can proceed to block 570.

At block 550, decoder 450 can set the color conversion indicator ColorConv to a NO value.

At block 552, decoder 450 can attempt to allocate input buffer IB having a size of image width*image size*input color space size. The input color space size can be expressed in terms of bytes, bits, pixels, or other convenient units, such as discussed above at block 530 with respect to an output color space size. The input color space sizes can have the same values; e.g., 1 byte for greyscale, 3 bytes for RGB or HSV, 4 bytes for CYMK, as used for output color space sizes. Other input color space sizes can be used as well or instead.

As an example, for an image of size 100 rows×200 columns using an input RGB color space, then the image height=100, the image width=200, the output color space size=3, and the image buffer IB can be attempted to be allocated with a size of 100*200*3=60,000 bytes. Many other examples are possible as well.

At block 560, decoder 450 can determine whether input buffer IB was successfully allocated using the techniques discussed above in the context of block 540. If IB was successfully allocated, decoder 450 can proceed to block 544; otherwise, IB was not successfully allocated and decoder 450 can proceed to block 562.

At block 562, decoder 450 can set the BuffAlloc indicator to NO.

At block 570, decoder 450 can use method 600 to receive image parts of an input image and generate corresponding image nodes as output.

Figure 6:
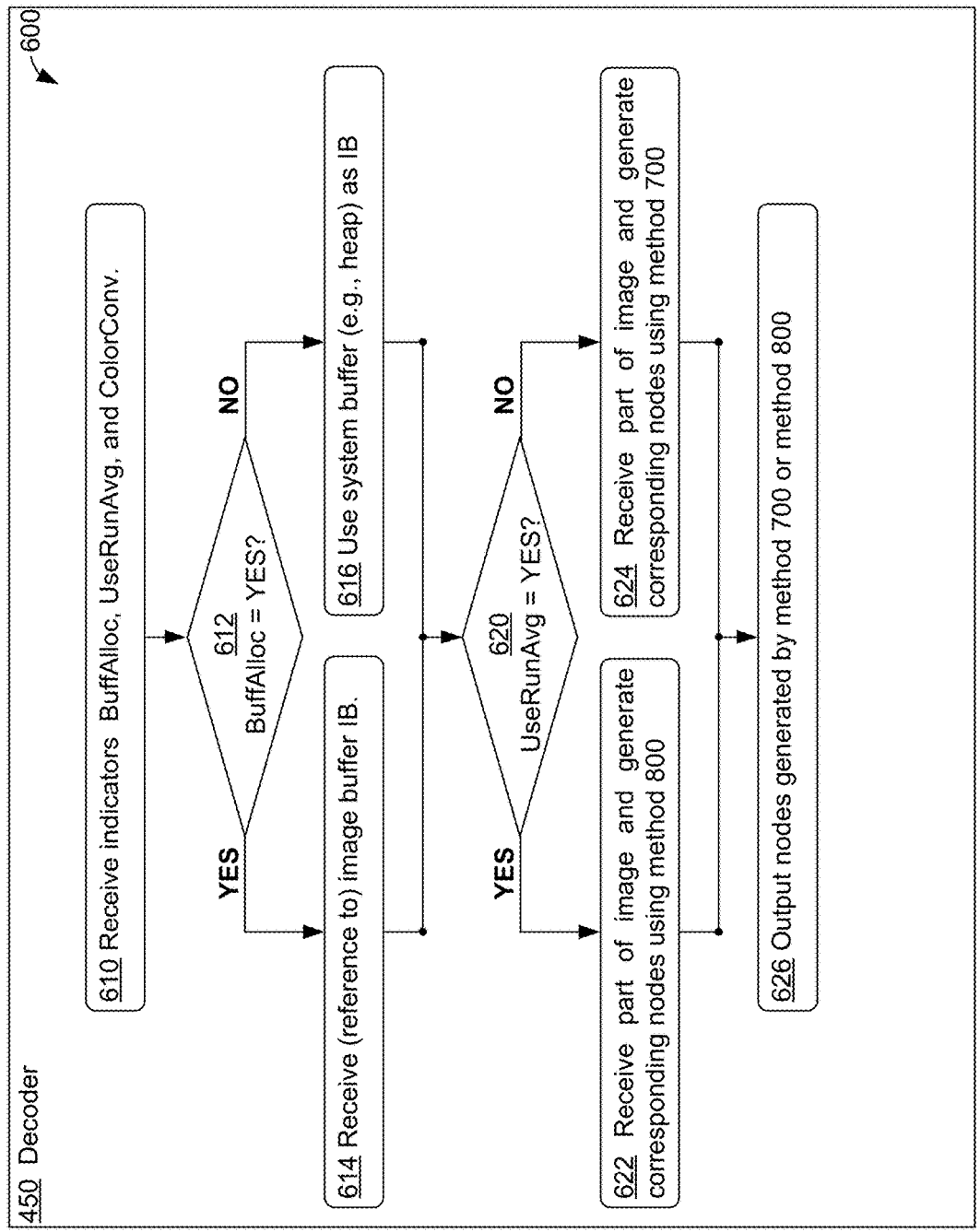
FIG. 6 shows a flowchart of another method executable by the decoder of FIG. 5, according to an example embodiment.

FIG. 6 shows a flowchart method 600 executable by a decoder, such as decoder 450, according to an example embodiment. Method 600 can begin at block 610, where decoder 450 can receive three indicators as inputs: indicator BuffAlloc, indicator UseRunAvg, and indicator ColorConv. Each of these three indicators is discussed above in more detail in the context of method 500 of FIG. 5. In some embodiments, each of the BuffAlloc, UseRunAvg, and ColorConv indicators can be provided as inputs, such as input parameters, when method 600 is invoked; e.g., at block 570 of method 500.

At block 612, decoder 450 can determine whether the BuffAlloc indicator is set to YES. As mentioned above, the BuffAlloc indicator can be set to YES if an input buffer IB is successfully allocated as part of method 500 or set to NO if input buffer IB was not successfully allocated as part of method 500. If the BuffAlloc indicator is set to YES, then decoder 450 can proceed to block 614; otherwise, decoder 450 can proceed to block 616.

At block 614, decoder 450 can receive input buffer IB. In some embodiments, decoder 450 can receive a reference to input buffer IB; e.g., a pointer to IB, and thereby indirectly receive input buffer IB. In other embodiments, input buffer IB (or a reference to IB) can be provided as an input, such as an input parameter, when method 600 is invoked. Upon completion of block 614, decoder 450 can proceed to block 620.

At block 616, decoder 450 can use a system buffer or other memory as input buffer IB.

At block 620, decoder 450 can determine whether the UseRunAvg indicator is set to YES. As mentioned above, UseRunAvg can be set to YES if run averaging is to be used or set to NO if run averaging is not to be used. If the UseRunAvg indicator is set to YES, then decoder 450 can proceed to block 622; otherwise, decoder 450 can proceed to block 624.

At block 622, decoder 450 can receive at least part of a run-length encoded image and generate image nodes corresponding to the at least part of the run-length encoded image using method 800. Upon completion of the use of method 800, decoder 450 can proceed to block 626.

At block 626, decoder 450 can output the image nodes generated by invoking method 700 at block 624 or the image nodes generated by invoking method 800 at block 622. In some embodiments, the image nodes can be output to one or more memory regions, where the image nodes can be retrieved by a renderer, such as renderer 460. In other embodiments, the image nodes can be output from decoder 450 all at one time; e.g., the image nodes are buffered until method 700 or method 800 is completed. In still other embodiments, the image nodes can be output from decoder 450 as they are generated by method 700 or method 800. In even other embodiments, method 600 can be completed after the outputting the image nodes.

Figure 7:
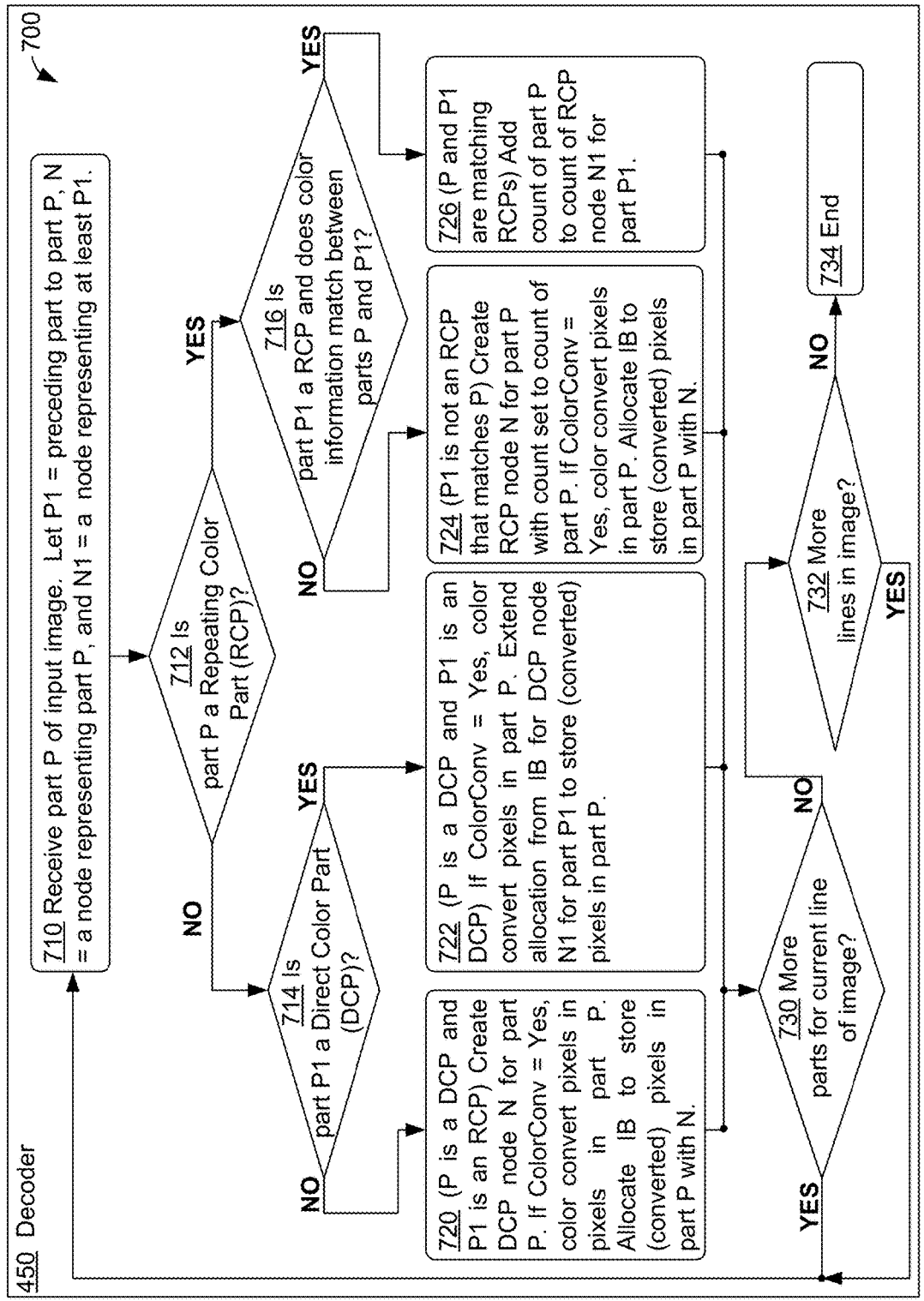
FIG. 7 shows a flowchart of yet another method executable by the decoder of FIG. 5, according to an example embodiment.

FIG. 7 shows a flowchart of method 700 executable by a decoder, such as decoder 450, according to an example embodiment. Method 700 can be used to decode an input image. To decode the input image, decoder 450 can use method 700 to generate one or more image nodes corresponding to image parts of an input run-length encoded image; e.g., a run-length encoded image whose page and image orientations match. Method 700 involves the use of merging techniques to merge image nodes associated with adjacent direct color parts and to merge image nodes associated with adjacent repeated color parts having the same color information. Then, the (merged) image nodes can be considered to be a decoded version of the run-length encoded image.

Method 700 can begin at block 710, where decoder 450 can receive an image part P of the input image. Decoder 450 can also let P1 be an immediately preceding image part P1 to image part P; that is, if both image parts P and P1 exist, then image parts P and P1 are adjacent image parts. For example, if the input image to method 700 were run-length encoded image 440b and if image part 474 were received as image part P, then image part P1 would be null or otherwise undefined, since no image part precedes image part 400 in run-length encoded image 440b. Continuing this example, if image part 476 were received as image part P, then image part P1 would be image part 474, as image part 474 immediately precedes image part 476 in run-length encoded image 440b. In some embodiments, method 700 can receive the input image or a reference to the input image and process the image parts as stored in the input image—in these embodiments, image part P can refer to an image part currently being decoded from the input image and image part P1 can refer to an image part that was decoded just prior to image part P being decoded. In some embodiments, image part P1 can be initialized to a null or otherwise undefined image part.

Decoder 450 can also let image node N be an image node representing the conversion of image part P to an image node, and let image node N1 be an image node representing the conversion of at least image part P1 to an image node; that is, image node N1 is an image node representing the conversion of one or more preceding image parts that include image part P1. In some embodiments, image node N1 can be initialized to a null or otherwise undefined image node.

At block 712, decoder 450 can determine whether image part P is a repeating color part. If image part P is a repeating color part, decoder 450 can proceed to block 716. Otherwise, image part P is not a repeating color part and decoder 450 can proceed to block 714.

At block 714, decoder 450 can determine whether image part P1 is a direct color part. If image part P1 is a direct color part, decoder 450 can proceed to block 722. Otherwise, image part P1 is not a direct color part, and decoder 450 can proceed to block 720. In some embodiments, image part P1 can be a null or otherwise undefined image part, which indicates that P1 is neither a direct color part nor a repeating color part.

At block 716, decoder 450 can determine whether image part P1 is a repeating color part and if color information matches between image parts P and P1. If image part P1 is a repeating color part and if color information matches between image parts P and P1, decoder 450 can proceed to block 726. Otherwise, image part P1 is not a repeating color part and/or color information does not match between image parts P and P1, and decoder 450 can proceed to block 724.

At block 720, decoder 450 can have determined that image part P is a direct color part and image part P1 is a repeating color part. Then, decoder 450 can create a direct color part node as image node N for image part P, set the count/length value of image node N to the number of pixels associated with image part P, and can allocate memory of input buffer IB that is associated with node N to store pixels currently associated with image part P. Decoder 450 can determine whether the ColorConv indicator is set to YES— if so, then decoder 450 can perform color conversion on the pixels of the color information for image part P and store the now-color-converted pixels in the allocated portion of input buffer IB that is associated with node N. Otherwise, decoder 450 can determine that the ColorConv indicator is set to NO and store the pixels of image part P in the allocated portion of input buffer IB that is associated with node N. Upon completion of block 720, decoder 450 can proceed to block 730.

At block 722, decoder 450 can have determined that adjacent image parts P and P1 are both direct color parts. Then, decoder 450 can update the count/length value of image node N1 to add the number of pixels associated with image part P, extend or otherwise allocate storage from input buffer IB that is associated with node N1 to additionally store pixels currently associated with image part P. Decoder 450 can determine whether the ColorConv indicator is set to YES—if so, then decoder 450 can perform color conversion on the pixels of the color information for image part P and store the now-color-converted pixels in the portion of input buffer IB associated with image node N1. Otherwise, decoder 450 can determine that the ColorConv indicator is set to NO and store the pixels of image part P in the allocated portion of input buffer IB that is associated with node N1. Upon completion of block 722, decoder 450 can proceed to block 730.

For an example of direct color part processing, Table 1 and FIG. 4D show adjacent direct color parts 484 and 486, where direct color part 484 is associated with pixel values 127 and 165, and direct color part 486 is associated with pixel values 255 and 242. Suppose that image part P1 is direct color part 484, image node N1 represents direct color part 484 and stores pixel values 127 and 165 in input buffer IB, the ColorConv indicator is set to NO.

Then, suppose decoder 450 continues to use method 700 to process direct color part 486. As such, at block 710, image part P would be direct color part 486, and method 700 would proceed to block 712, take the NO branch of block 712 to reach block 714, and take the YES branch of block 714 to reach block 722. At block 722, decoder 450 can update the count/length field of node N1 to be equal to 4, extend the allocation of image buffer IB node N1, and store the two pixels having respective pixel values 255 and 242 associated with direct color part 484/image part P. Then, upon completion of block 722, node N1 would then be associated with a portion of input buffer IB storing four pixels having respective pixel values: 127, 165, 255, and 242.

At block 724, decoder 450 can determine that either (a) P1 is a direct color part but P is a repeating color part, or (b) adjacent image parts P and P1 are both repeating color parts, but the color information of image part P differs from the color information of image part P1; that is, image part P does not match image part P1. Then, decoder 450 can create a repeating color part node as image node N for image part P and can allocate memory of input buffer IB that is associated with node N to store one pixel currently associated with image part P. Decoder 450 can set the count indicator of node N equal to the count value of image part P. Decoder 450 can determine whether the ColorConv indicator is set to YES—if so, then decoder 450 can perform color conversion on the one pixel of the color information for image part P and store the now-color-converted pixel(s) in the allocated portion of input buffer IB that is associated with node N. Otherwise, decoder 450 can determine that the ColorConv indicator is set to NO and store the one pixel of image part P in the allocated portion of input buffer IB that is associated with node N. Upon completion of block 724, decoder 450 can proceed to block 730.

At block 726, decoder 450 can determine that adjacent image parts P and P1 are both repeating color parts and that the color information of image part P is the same as the color information of image part P1; that is, image parts P and P1 do match. Then, decoder 450 can update the count of (repeating color part) image node N1 to add the count of image part P to the count/length field of image node N1. Upon completion of block 726, decoder 450 can proceed to block 730.

For an example of repeated color part processing, suppose that the input image has an input line that begins with three succeeding image parts: image part IP1 as a repeating image part representing 10 RGB pixels, each pixel having a RGB value of {0, 0, 255}, image part IP2 as a repeating image part representing 20 RGB pixels, each pixel having a RGB value of {0, 0, 254}, image part IP3 as a repeating image part representing 30 RGB pixels, each pixel having a RGB value of {0, 0, 254}, and that color conversion is not performed. Upon receiving image part IP1, decoder 450 can use method 700 to proceed to block 712, take the YES branch of block 712 to proceed to block 716, and take the NO branch (since there is no preceding image part P1 for this line of the input image) to proceed to block 724. At block 724, decoder 450 can create image node IM1 to store the three RGB values of the one pixel {0, 0, 255} associated with image part IP1, and set the count/length field of IM1 to be 10.

Then, suppose decoder 450 continues to use method 700 to process image part IP2. At block 710, image part P can be associated with image part IP2, image part P1 can be associated with image part IP1, and node N1 can be associated with IM1. Decoder 450 can then proceed to block 712 and take the YES branch to block 716. At block 716, decoder 450 can determine that adjacent image parts P and P1 are both repeating color parts, but the color information for image part P representing the RGB pixel {0, 0, 254} differs from the color information for image part P1 representing the RGB pixel {0, 0, 255}, and then proceed to block 724. At block 724, decoder 450 can create image node IM2 to store the three RGB values {0, 0, 254} of the one pixel associated with image part IP2, and set the count/length field of IM1 to be 20.

Then, suppose decoder 450 continues to use method 700 to process image part IP3. At block 710, image part P can be associated with image part IP3, image part P1 can be associated with image part IP2, and node N1 can be associated with IM2. Decoder 450 can then proceed to block 712 and take the YES branch to block 716. At block 716, decoder 450 can determine that adjacent image parts P and P1 are both repeating color parts and that the color information for image part P representing the RGB pixel {0, 0, 254} is the same as the color information for image part P1 representing the RGB pixel {0, 0, 254}, and then proceed to block 726. At block 726, decoder 450 can update the count/length value of image node N1/image node IM2 to be 20 (for image part IP2)+30 (for image part IP3)=50. At the end of block 726, image node N1/image node IM2 would have a count/length value of 50 and be associated with storage in input buffer IB representing the RGB pixel {0, 0, 254}.

At block 730, decoder 450 can determine whether there are more image parts for a current line of the image. If there are image parts for the current line of the image, decoder 450 can proceed to block 710. In some embodiments, decoder 450 can set image part P1 to image part P and/or can set image node N1 to image node N before proceeding to block 710; i.e., the processed image part P is now the preceding image part P1 and/or the processed node N is now the preceding node N1 for a next iteration of method 700.

If there are no image parts for the current line of the image; i.e., the image parts for the current line have all been converted to nodes by method 700, decoder 450 can proceed to block 732. In other embodiments, decoder 450 can set image part P1 to a null or otherwise undefined image part and/or can set image node N1 to a null or otherwise undefined image node before proceeding to block 732, to indicate that there is no preceding image part P1 and/or image node P1 for the next line (if any) of the input image to be processed by method 700.

At block 732, decoder 450 can determine whether there are more lines in the input image. If there are more lines in the input image, decoder 450 can proceed to block 710. If there are no more lines in the input image, decoder 450 can proceed to block 734.

At block 734, decoder 450 can complete method 700.

Figure 8:
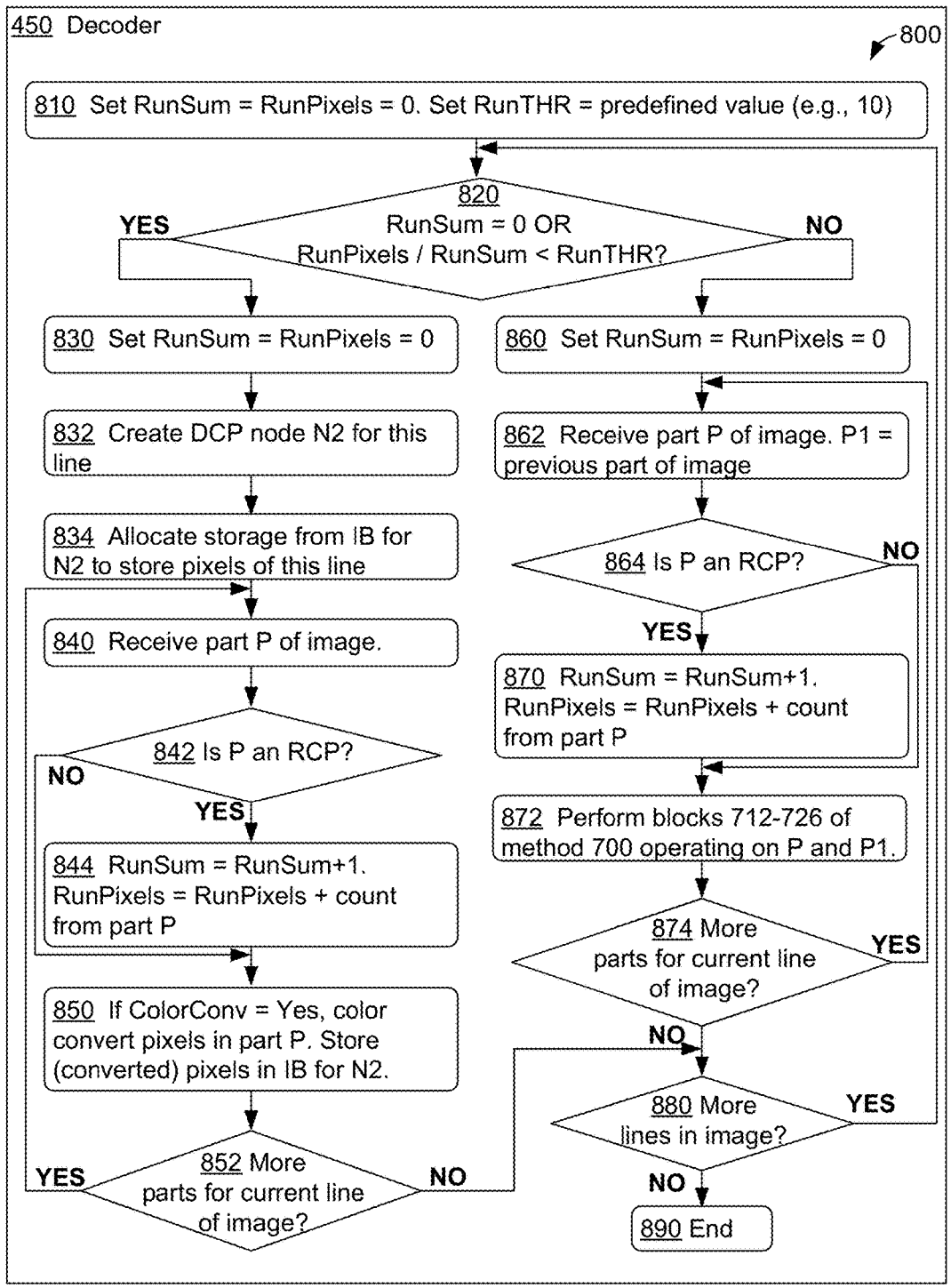
FIG. 8 shows a flowchart of even another method executable by the decoder of FIG. 5, according to an example embodiment.

FIG. 8 shows a flowchart of method 800 executable by a decoder, such as decoder 450, according to an example embodiment. As with method 700, method 800 can be used to decode an input image by generating one or more image nodes corresponding to image parts of an input run-length encoded image; e.g., a run-length encoded image whose page and image orientations match. Then, the image nodes can be considered to be a decoded version of the run-length encoded image.

Method 800 relies on the merging techniques of method 700 to merge image nodes associated with adjacent direct color parts and to merge image nodes associated with adjacent repeated color parts having the same color information. However, method 800 can use run averaging to reduce the number of image nodes generated to represent an input run-length encoded image, while method 700 does not use run averaging.

Method 800 can begin at block 810, where decoder 450 can initialize three values: RunSum, RunPixels, and RunTHR. The RunSum value can store a number of repeating color part used to represent a current line of an input image for decoder 450. The RunPixels value can store a number of pixels represented by repeating color parts for the current line of the input image. The RunTHR value can store a threshold value indicating a number of pixels represented per repeating color part of the input image. At block 810, RunSum and RunPixels can each be initialized to 0 and RunTHR can be set to a predetermined positive value, such as 3.333, 5, 10, or 20. Other example values of RunTHR are possible as well.

At block 820, decoder 450 can determine whether to use one image node to represent the current line of the input image. Decoder 450 can make this determination based on the ratio of ratio RunPixels/RunSum (assuming RunSum≠0). If the ratio RunPixels/RunSum for a previous line just prior to the current line of the input image exceeds RunTHR, then the repeating color parts of the previous line can be considered to represent enough pixels per repeating color part so that decoder 450 does not utilize more memory in generating nodes for the repeating color parts of an input line than used to represent all pixels of the input line. That is, the comparison of the ratio RunPixels/RunSum to RunTHR can be used as an (approximate) comparison of the memory consumed as overhead for generating nodes for an input line to the memory used by expanding all repeating color parts and subsequently storing all of the pixels in the input line.

At block 820, decoder 450 can determine whether RunSum equals 0 or, when RunSum is not equal to zero, if the ratio RunPixels/RunSum is less than RunTHR. If RunSum equals 0 or if the ratio (RunPixels/RunSum) is less than RunTHR, then decoder 450 can proceed to block 830. Otherwise, either RunSum is not equal to zero 0 or the ratio (RunPixels/RunSum) is greater than or equal to RunTHR, and decoder 450 can proceed to block 860.

The procedures of blocks 830 through 852 can be used to create one image node for the current line of the input image. At block 830, decoder 450 can set each of RunSum and RunPixels equal to 0. At block 832, decoder 450 can create a direct color part node N2 to represent the current line. At block 834, decoder 450 can allocate storage from input buffer IB to node N2 to store all of the pixels in the current line.

At block 840, decoder 450 can receive an image part P of the current line of the image.

At block 842, decoder 450 can determine whether image part P is a repeating color part. If image part P is a repeating color part, then decoder 450 can proceed to block 844. If image part P is not a repeating color part, then decoder 450 can proceed to block 850.

At block 844, decoder 450 can update the RunSum and RunPixels values. These values can be updated by decoder 450 even though the current line is represented by one direct color part image node—node N2—so that the RunPixels/RunSum ratio can be used for the next line of the input image (if any). Specifically, decoder 450 can increment the RunSum value by adding one to the RunSum value and can update the RunPixels value by adding the count value of repeating color part P to the RunPixels value.

At block 850, decoder 450 can determine whether the ColorConv indicator is set to YES. If the ColorConv indicator is set to YES, the pixels associated with image part P can be color converted; otherwise (e.g., ColorConv is set to NO) the pixels associated with image part P can be left un-color-converted. Then, the possibly-color-converted pixels associated with image part P can be stored in the storage from input buffer IB allocated to node N2 at block 834 so that the storage from input buffer IB allocated to node N2 represents part or all of the (color-converted) current line of the input image.

At block 852, decoder 450 can determine whether there are more image parts for the current line of the input image. If there are more image parts for the current line of the input image, then decoder 450 can proceed to block 840. Otherwise, as there are no more image parts for the current line of the input image, decoder 450 can proceed to block 880.

At block 860, decoder 450 can set each of RunSum and RunPixels equal to 0.

At block 862, decoder 450 can receive an image part P of the current line of the image and assign image part P1 to be the previous image part of the current line of the image. If image part P is the first line of the current line of the image; i.e., there are no previous image parts to image part P for the current line, then decoder 450 can assign image part P1 to a null or otherwise undefined image part.

At block 864, decoder 450 can determine whether image part P is a repeating color part. If image part P is a repeating color part, then decoder 450 can proceed to block 870. If image part P is not a repeating color part, then decoder 450 can proceed to block 872.

At block 870, decoder 450 can update the RunSum and RunPixels values. Specifically, decoder 450 can increment the RunSum value by adding one to the RunSum value and can update the RunPixels value by adding the count value of repeating color part P to the RunPixels value.

At block 872, decoder 450 can use the procedures of blocks 712-716 of method 700 operating on image parts P and P1 to decode image part P. Blocks 712-716 of method 700 are discussed in more detail above in the context of FIG. 7.

At block 874, decoder 450 can determine whether there are more image parts for the current line of the input image. If there are more image parts for the current line of the input image, then decoder 450 can proceed to block 862. Otherwise, as there are no more image parts for the current line of the input image, decoder 450 can proceed to block 880.

At block 880, decoder 450 can determine whether there are more input lines in the input image. If there are more input lines in the input image, decoder 450 can proceed to block 820. Otherwise, as there are no more input lines in the input image, decoder 450 can proceed to block 890.

At block 890, decoder 450 can complete method 800.

Figure 9:
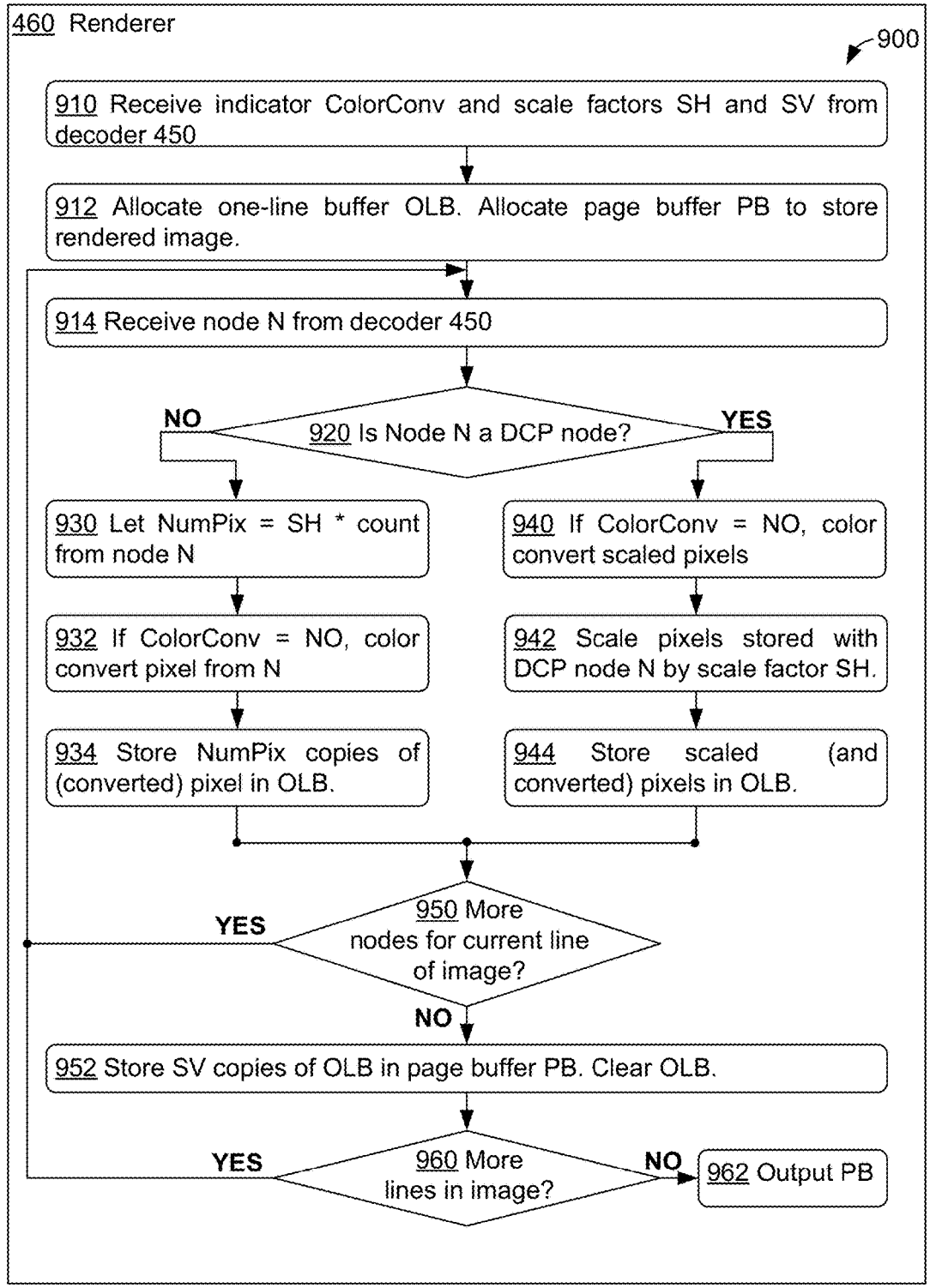
FIG. 9 shows a flowchart of a method executable by a renderer, according to an example embodiment.

FIG. 9 shows a flowchart of method 900, according to an example embodiment. Method 900 can be executed by a renderer, such as renderer 460, to render an image represented as one or more image nodes. In some embodiments, method 900 can be utilized as an implementation of block 420 of method 400; that is, method 900 can be used to render a run-length encoded image whose page and image orientations match. In particular of these embodiments, method 900 can be used as an implementation of both blocks 420 and 430 of method 400; that is, in these embodiments, method 900 can be used to render a run-length encoded image whose page and image orientations match.

Method 900 can begin at block 910, where renderer 460 can receive indicator ColorConv and scale factors SH and SV from decoder 450. Scale factor SH can be a horizontal scale factor and scale factor SV can be a vertical scale factor. For example, scale factor SH can be used to scale pixels along horizontal lines of a rendered image, and scale factor SV can be used to scale the horizontal lines of the rendered image. For example, if SH=SV=2, then each input pixel in a horizontal line of the rendered image can be duplicated once in rendering the horizontal line, thereby scaling the horizontal line by a factor of two, and each horizontal line can be rendered twice, thereby scaling the image vertically by a factor of two. In some embodiments, SH and SV can each be restricted to values that are greater than zero.

At block 912, renderer 460 can allocate a one-line buffer OLB with enough memory to store at least one line of the rendered image. For example, OLB can store at least image width*SJ (output color space size bytes, where image width is the size of one horizontal line of the input image specified in terms of pixels and where output color space size specifies a number of bytes used to store one output color space pixel. Also, renderer 460 can allocate a page buffer PB with enough memory to store a rendered image. For example, PB can store at least (image width*SH)*(image height*SV) *output color space bytes, where image height equals a number of lines in the input image.

At block 914, renderer 460 can receive an image node N. For example, image node N can be received from decoder 450.

At block 920, renderer 460 can determine whether image node N is a direct color part node. If image node N is a direct color part node, then renderer 460 can proceed to block 940. Otherwise, image node N is not a direct color part node, and rendered 460 can proceed to block 930.

Blocks 930-934 can be used to render a portion of an image represented by a repeated color part node. At block 930, renderer 460 can determine a value NumPix equal to horizontal scale factor SH times the count value from (repeated color part) image node N. At block 932, renderer 460 can determine whether the ColorConv indicator is set to NO. Then, when the ColorConv indicator is set to NO, renderer 460 can perform color conversion on the pixel stored in the color information stored in (repeated color part) image node N.

At block 934, renderer 460 can store NumPix copies of either the pixel stored in the color information of node N (when the ColorConv indicator is set to YES) or the color-converted pixel generated at block 934 (when the Color-Conv indicator is set to NO) in one line buffer OLB. Upon completion of block 934, renderer 460 can proceed to block 950.

For example, suppose that image node N represents a repeated color part for a greyscale pixel represented as 128 (medium grey) and where the count or image node N equals 12; that is, image node N represents 12 medium grey pixels, horizontal scale factor SH equals 1, and further suppose ColorConv is NO and that the output image is represented using an RGB color space. Then, for this example, at block 930, NumPix=SH*count=1*12=12; at block 932, the "128" grey scale representation stored with image node N can be color converted to an RGB representation such as {128, 128, 128}; and at block 934, since NumPix=12, twelve copies of the color converted pixel {128, 128, 128} can be stored in OLB. Other examples are possible as well.

Blocks 940-944 can be used to render a portion of an image represented by a direct color part node.

At block 940, renderer 460 can determine whether the ColorConv indicator is set to NO. Then, when the Color-Conv indicator is set to NO, renderer 460 can perform color conversion on the scaled pixels determined at block 940. In some embodiments, a temporary buffer can be allocated to store the color-converted pixels for later use by renderer 460. In particular of these embodiments, the temporary buffer can be allocated once and reused by renderer 460 while executing method 900 to render an image. In other particular embodiments, renderer 460 can copy pixels stored as color information for (direct color part) node N into the temporary buffer when the ColorConv indicator is set to YES—in these embodiments, renderer 460 can obtain color-converted or non-color-converted pixels from the same temporary buffer regardless of whether color conversion takes place.

At block 942, renderer 460 can scale pixels stored as color information for (direct color part) node N by horizontal scale factor SH, where SH>0. For one technique to scale the pixels, a counter PixScale can be initialized to 0. Then, for each pixel PIX1 stored as color information in (direct color part) node N, PixScale can be incremented by SH. After PixScale is incremented, renderer 460 can, while PixScale is greater than or equal to 0.5, store a copy of PIX1 as a scaled pixel and PixScale can be decremented by 1. For example, suppose node N stores five pixels in color information and SH=0.4. Then, for the first pixel in color information of node N, PixScale has a value of 0.4, which is less than 0.5, so the first pixel is not stored as a scaled pixel. For the second pixel in color information of node N, PixScale has a value of 0.4+0.4=0.8. As PixScale is greater than or equal to 0.5, the second pixel is stored as a scaled pixel and PixScale is decremented to 0.8−1=−0.2. For the third pixel in color information of node N, PixScale has a value of −0.2+0.4=0.2, which is less than 0.5, so the third pixel is not stored as a scaled pixel. For the fourth pixel in color information of node N, PixScale has a value of 0.2+0.4=0.6. As PixScale is greater than or equal to 0.5, the fourth pixel is stored as a scaled pixel and PixScale is decremented to 0.6−1=−0.4. For the fifth pixel in color information of node N, PixScale has a value of −0.4+0.4=0.0, which is less than 0.5, so the fifth pixel is not stored as a scaled pixel. As a result of this example, two pixels are stored as scaled pixels—the two scaled pixels in this example are copies of the second and fourth pixels stored in color information of node N.

As another example, suppose node N stores five pixels in color information and SH=1.4. Then, for the first pixel in color information of node N, PixScale has a value of 1.4, so one copy of the first pixel is stored as a scaled pixel and PixScale is reduced to 0.4. For the second pixel in color information of node N, PixScale has a value of 0.4+1.4=1.8, so two copies of the second pixel are stored as scaled pixels and PixScale is reduced to −0.2. For the third pixel in color information of node N, PixScale has a value of −0.2+1.4=1.2, so one copy of the third pixel is stored as a scaled pixel and PixScale is reduced to 0.2. For the fourth pixel in color information of node N, PixScale has a value of 0.2+1.4=1.6, so two copies of the fourth pixel are stored as scaled pixels and PixScale is reduced to −0.4. For the fifth pixel in color information of node N, PixScale has a value of −0.4+1.4=1.0, so one copy of the fifth pixel is stored as a scaled pixel and PixScale is reduced to 0.0. As a result of this example, seven scaled pixels are stored as scaled pixels—one copy of the first pixel, two copies of the second pixel, one copy of the third pixel, two copies of the fourth pixel, and one copy of the fifth pixel—are stored in color information of node N. Other techniques and examples of scaling pixels are possible as well.

In some embodiments, renderer 460 can scale pixels stored as color information for (direct color part) node N by horizontal scale factor SH by first retrieving the pixels from a temporary buffer, such as a temporary buffer used for color converting pixels discussed above int the context of block 940, and then scaling the pixels.

At block 944, renderer 460 can store the scaled and possibly color-converted pixels in one-line buffer OLB. In some embodiments, the procedures of block 944 can be omitted. For example, memory for the scaled and possibly color-converted pixels can be allocated from part or all of the one-line buffer OLB. For example, suppose the color information for the DCP node stores data for two pixels PIX11 and PIX12 that are to be scaled by a scale factor SH=2. Also suppose that the scaled pixels of the DCP node are to be stored staringt at index position X of OLB, where X≥0 (if zero-based indexing is used for the one-line buffer OLB) or X≥1 (if one-based indexing is used for the one-line buffer OLB). That is, copies of PIX11, after scaling by a scale factor SH=2 and possible color conversion, will be placed at index locations X and X+1 of OLB and copies of PIX12, after scaling and possible color conversion, will be placed at index locations X+2 and X+3 of OLB. Then, if the memory used to store the four pixels at index locations X, X+1, X+2, and X+3 of OLB is allocated for use to perform the procedures for blocks 940 and 942, then the resulting scaled and possibly color-converted pixels will already be stored in OLB. Thus, renderer 460 can omit block 944 in these embodiments.

At block 950, renderer 460 can determine whether there are more nodes for the current line of the input image to be rendered. If there are more nodes for the current line of the input image to be rendered, renderer 460 can proceed to block 914. Otherwise, as there are no more nodes for the current line of the input image to be rendered, renderer 460 can proceed to block 952.

At block 952, renderer 460 can store SV copies of the one-line buffer OLB in page buffer PB to scale the input image vertically.

At block 960, renderer 460 can determine whether there are more lines in the input image to be rendered. If there are more lines in the input image to be rendered, renderer 460 can proceed to block 914. Otherwise, as there are no more lines in the input image to be rendered, renderer 460 can proceed to block 962.

At block 962, renderer 460 can output page buffer PB, which contains a rendered image. Upon completion of block 962, renderer 462 can complete method 900. In some embodiments, renderer 460 can output the rendered image along with or instead of outputting page buffer PB.

Figure 10A:
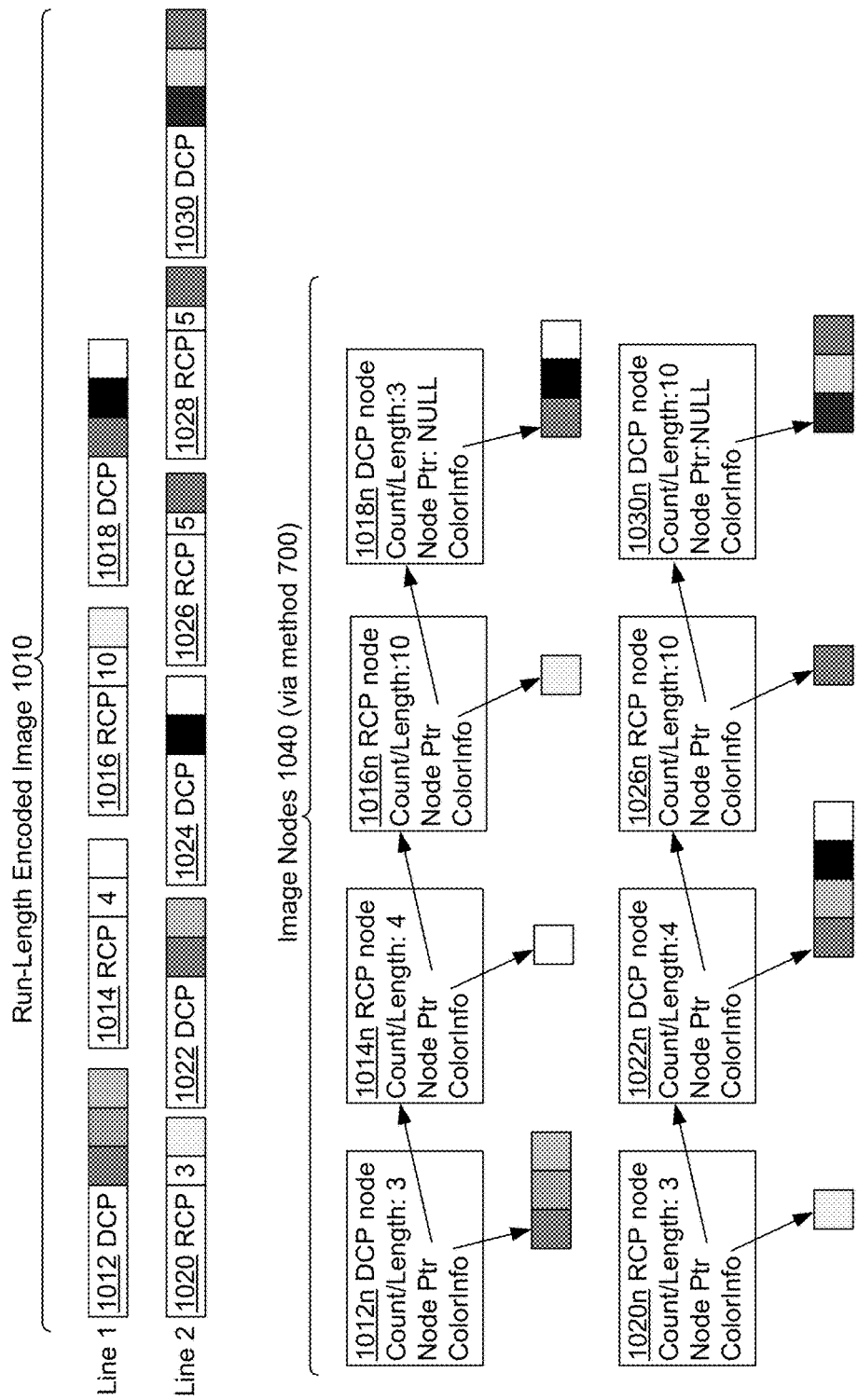
FIG. 10A shows a run-length encoded image and corresponding image nodes, according to an example embodiment.

FIG. 10A shows run-length encoded image 1010 and corresponding image nodes 1040, according to an example embodiment. As shown in FIG. 10A, run-length encoded image 1010 includes two lines—Line 1 and Line 2—and each line is encoded using image parts. Line 1 is encoded using image parts 1012, 1014, 1016, and 1018, while Line 2 is encoded using image parts 1020, 1022, 1024, 1026, 1038, and 1030.

Table 2 summarizes image parts 1012-1030. For example, Table 2 indicates that Line 1 of Image 1010 includes Direct Color Part 1012, Repeating Color Part 1014, Repeating Color Part 1016, and Direct Color Part 1018. In particular for this example, Table 2 indicates that the length field of Direct Color Part 1012 is 3 and that the color information of Direct Color Part 1012 stores three greyscale pixels having greyscale color values of 127, 165, and 191, respectively.

TABLE 2

| Image 1010 Line No. | Image Part | Image Part Count/Length | Image Part Color Info. (greyscale) | Image Nodes 1040 | Image Nodes 1050 |
|---|---|---|---|---|---|
| Line 1 | Direct Color Part 1012 | 3 | 127, 165, 191 | 1012n | 1052n |
|  | Repeating Color Part 1014 | 4 | 255 | 1014n | 1052n |
|  | Repeating Color Part 1016 | 10 | 242 | 1016n | 1052n |
|  | Direct Color Part 1018 | 3 | 127, 0, 255 | 1018n | 1052n |
| Line 2 | Repeating Color Part 1020 | 3 | 242 | 1020n | 1054n |
|  | Direct Color Part 1022 | 2 | 127, 191 | 1022n | 1054n |
|  | Direct Color Part 1024 | 2 | 0, 255 | 1022n | 1054n |
|  | Repeating Color Part 1026 | 5 | 127 | 1026n | 1054n |
|  | Repeating Color Part 1028 | 5 | 127 | 1026n | 1054n |
|  | Direct Color Part 1030 | 3 | 41, 215, 127 | 1030n | 1054n |

FIG. 10A also shows image nodes 1040 generated for run-length encoded image 1010 using method 700 discussed above in the context of FIG. 7. Image nodes 1040 include image nodes 1012n, 1014n, 1016n, and 1018n for one line (Line 1) of image 1010, and include image nodes 1020n, 1022n, 1026n, and 1030n for one line (Line 2) of image 1010. Image nodes 1040 and Table 2 indicate that a decoder, such as decoder 450, can execute method 700 for Line 1 of image 1010 to convert respective image parts 1012, 1014, 1016, 1018 into respective image nodes 1012n, 1014n, 1016n, 1018n. Image nodes 1040 and Table 2 also indicate that decoder 450 can execute method 700 for Line 2 of image 1010 to convert respective image parts 1020, 1022, 1024, 1026, 1028, 1030 into respective image nodes 1020n, 1022n, 1022n, 1026n, 1026n, 1030n.

As indicated above, method 700 merges image nodes associated with adjacent direct color parts and merges image nodes associated with adjacent repeated color parts having the same color information. In particular, decoder 450 can, while executing method 700, determine that adjacent image parts 1022 and 1024 are both direct color parts and so can be merged into one node, node 1022n, having the color information for the four pixels represented by image parts 1022 and 1024. Also, decoder 450 can, while executing method 700, determine that adjacent image parts 1026 and 1028 are both repeating color parts and both represent a greyscale pixel having a value of 127, and so can be merged into one node-node 1026n with a count of 5+5=10, representing 10 greyscale pixels having a value of 127 represented by image parts 1026 and 1028.

FIG. 10B shows run-length encoded image 1010, according to an example embodiment. As discussed above in the context of FIG. 10A, run-length encoded image 1010 includes two lines—Line 1 and Line 2—and each line is encoded using image parts. Line 1 is encoded using image parts 1012, 1014, 1016, and 1018, while Line 2 is encoded using image parts 1020, 1022, 1024, 1026, 1038, and 1030. Image parts 1012-1030 are summarized in Table 2 above.

FIG. 10C shows image nodes 1050 generated by a decoder, such as decoder 450, for run-length encoded image 1010 using method 800 discussed above in the context of FIG. 8, according to an example embodiment. Image nodes 1050 include image node 1052n for Line 1 of image 1010 and image node 1054n for Line 2 of image 1010. Image nodes 1050 and Table 2 indicate that decoder 450 can execute method 800 for Line 1 of image 1010 to convert respective image parts 1012, 1014, 1016, 1018 into image node 1052n and convert respective image parts 1020, 1022, 1024, 1026, 1028, 1030 into image node 1054n. As shown in FIG. 10C, both image nodes 1052n and 1054n have a count/length value of 20 and node pointer values of NULL indicating that both image nodes 1052n and 1054n encode 20 pixels and are the only nodes for their respective image lines (otherwise, the node pointer values would be non-NULL).

As indicated above, method 800 utilizes run averaging and relies upon method 700 to merge image nodes associated with adjacent direct color parts and to merge image nodes associated with adjacent repeated color parts having the same color information. When executing method 800, decoder 450 can initialize the RunSum value to 0 at block 810 and, for generation of image nodes 1050, RunTHR is initially set to 10. As RunSum is initially set to 0, decoder 450 will always take the YES branch at block 820 for the first line of an image, thus indicating that the first line of the image will always be encoded into one node when using blocks 830-852 of method 800, leading to generation of image node 1052n. Also, decoder 450 can determine that RunPixels=14 and RunSum=2 for the image parts 1012, 1014, 1016, 1018 of Line 1.

Upon completion of Line 1, decoder 450 can then take the YES branch of block 880 to return to block 820. At block 820, decoder 450 can take the YES branch since RunPixels/RunSum=7 is less than RunTHR=10. Then, as the YES branch was taken at block 820, decoder 450 can convert image parts 1020-1030 for Line 2 of image 1010 into one image node using blocks 830-852 of method 800, leading to generation of image node 1054n. Upon finishing the conversion of Line 2 of image 1010, decoder 450 can then take the NO branch of block 880 to terminate method 800.

FIG. 10D shows rendered image 1060, according to an example embodiment. Rendered image 1060 can be generated by a renderer, such as renderer 460, executing method 900 on either image nodes 1040 or image nodes 1050, where horizontal scale factor SH and vertical scale factor SV are both equal to 1. Rendered image 1060 is shown in FIG. 10D with relatively large pixels and with black lines surrounding each pixel to clearly indicate pixels in the image; in some examples, rendered image 1060 can have smaller pixels and/or have fewer or no lines surrounding pixels.

Figure 10E:
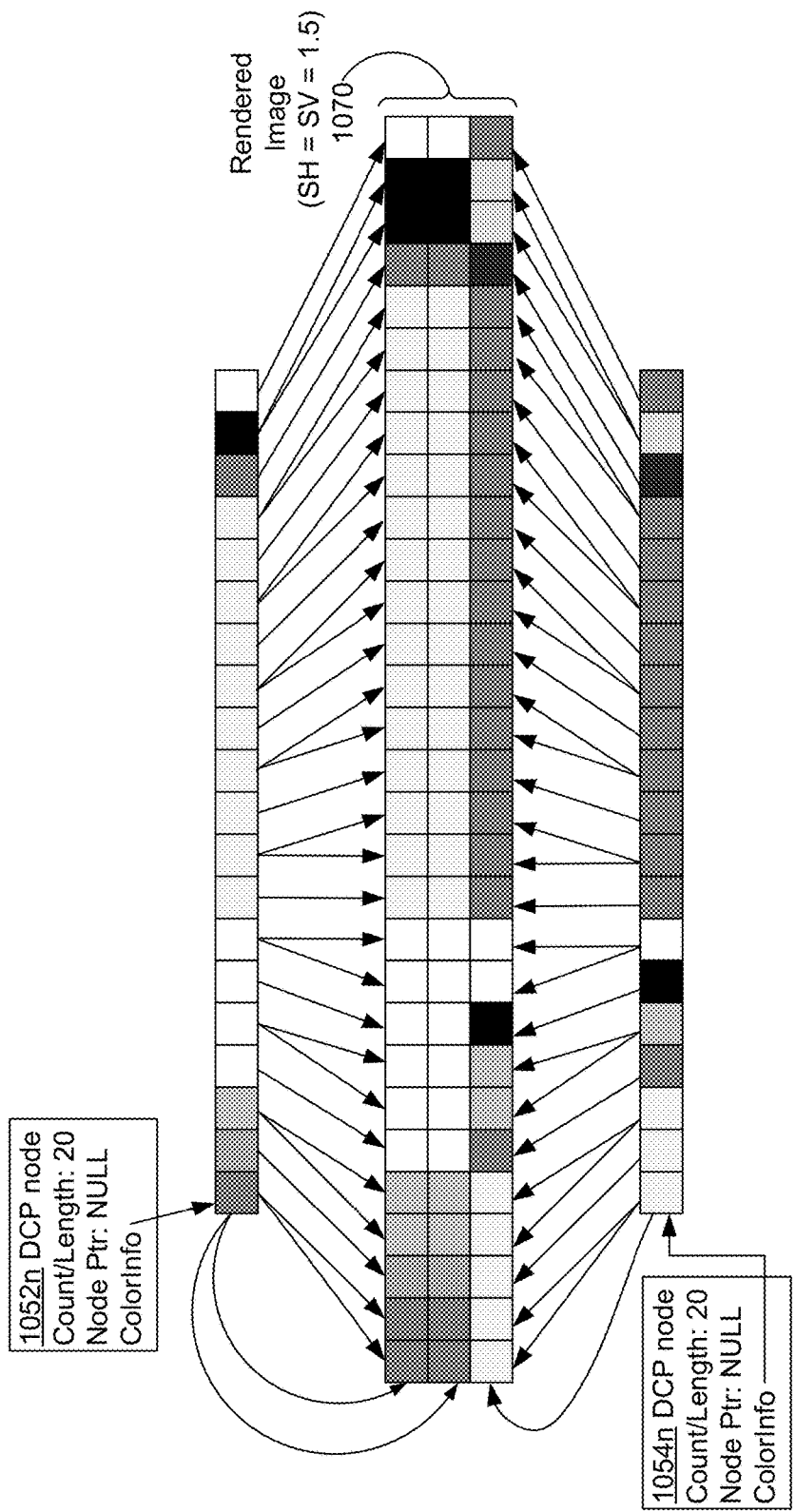
FIG. 10E shows a scaled and rendered image, according to an example embodiment.

FIG. 10E shows rendered image 1070, according to an example embodiment. Rendered image 1070 can be generated using renderer 460 executing method 900 on either image nodes 1040 or image nodes 1050, where horizontal scale factor SH and vertical scale factor SV are both equal to 1.5. In the particular example shown in FIG. 10E, image nodes 1050, which include image node 1052n and image node 1054n, are used to render image 1070. Rendered image 1070 is shown in FIG. 10E with relatively large pixels and with black lines surrounding each pixel to clearly indicate pixels in the image; in some examples, rendered image 1070 can have smaller pixels and/or have fewer or no lines surrounding pixels.

Each line of rendered image 1070 can be scaled horizontally using the scaling technique discussed above in the context of block 940 of method 900. The lines of rendered image 1070 can be scaled vertically using a similar technique to the scaling technique discussed above in the context of block 940 of method 900. As shown in FIG. 10E, every other pixel represented in color information of both image nodes 1052n and 1054n has been duplicated in keeping with the horizontal scale factor SH=1.5. Further, the line of rendered image 1070 represented by image node 1052n has been duplicated, and thus scaled vertically, in keeping with the vertical scale factor SV=1.5.

Figure 11:
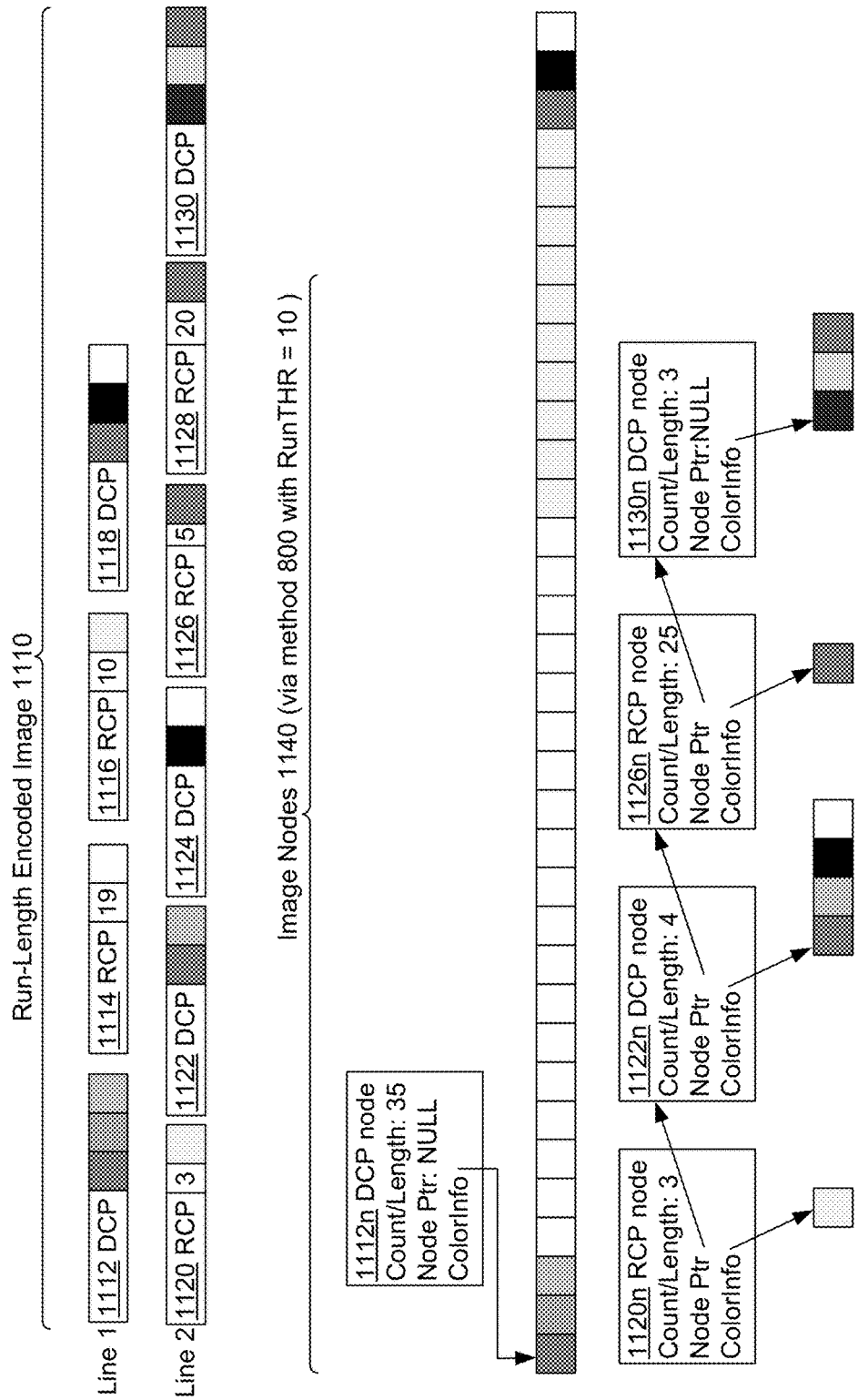
FIG. 11 shows yet another run-length encoded image and corresponding image nodes, according to an example embodiment.

FIG. 11 shows yet another run-length encoded image 1110 and corresponding image nodes 1140, according to an example embodiment. As shown in FIG. 11, run-length encoded image 1110 includes two lines—Line 1 and Line 2—and each line is encoded using image parts. Line 1 is encoded using image parts 1112, 1114, 1116, and 1118, while Line 2 is encoded using image parts 1120, 1122, 1124, 1126, 1128, and 1130.

Table 3 summarizes image parts 1112-1130. For example, Table 3 indicates that Line 1 of Image 1010 includes Direct Color Part 1112, Repeating Color Part 1114, Repeating Color Part 1116, and Direct Color Part 1118. In particular for this example, Table 3 indicates that the length field of Direct Color Part 1112 is 3 and that the color information of Direct Color Part 1112 stores three greyscale pixels having greyscale color values of 127, 165, and 191, respectively.

TABLE 3

| Image 1110 Line No. | Image Part | Count/ Length of Image Part | Image Part Color Information (greyscale) | Image Nodes 1140 |
|---|---|---|---|---|
| Line 1 | Direct Color Part 1112 | 3 | 127, 165, 191 | 1112n |
|  | Repeating Color Part 1114 | 19 | 255 | 1112n |
|  | Repeating Color Part 1116 | 10 | 242 | 1112n |
|  | Direct Color Part 1118 | 3 | 127, 0, 255 | 1112n |
| Line 2 | Repeating Color Part 1120 | 3 | 242 | 1120n |
|  | Direct Color Part 1122 | 2 | 127, 191 | 1122n |
|  | Direct Color Part 1124 | 2 | 0, 255 | 1122n |
|  | Repeating Color Part 1126 | 5 | 127 | 1126n |
|  | Repeating Color Part 1128 | 20 | 127 | 1126n |

TABLE 3-continued

| Image 1110 Line No. | Image Part | Count/ Length of Image Part | Image Part Color Information (greyscale) | Image Nodes 1140 |
|---|---|---|---|---|
|  | Direct Color Part 1130 | 3 | 41, 215, 127 | 1130n |

FIG. 11 also shows image nodes 1140 generated for run-length encoded image 1110 using method 800 discussed above in the context of FIG. 8, according to an example embodiment. Image nodes 1140 include image node 1112n for Line 1 of image 1110 and image nodes 1120n, 1122n, 1126n, and 1130n for Line 2 of image 1110. Image nodes 1140 and Table 2 indicate that decoder 450 can execute method 800 for Line 1 of image 1110 to convert respective image parts 1112, 1114, 1116, and 1118 into image node 1112n, convert image part 1120 into image node 1120n, convert image parts 1122 and 1124 into image node 1122n, convert image parts 1126 and 1128 into image node 1126n, and convert image part 1130 into image node 1130n.

As shown in FIG. 11, image node 1112n has a count/length value of 35 and a node pointer value of NULL, both of which indicate that image node 1112n is the only image node for the 35-pixel-long Line 1 of image 1110. In contrast, each of image nodes 1120n, 1122n, 1126n, and 1130n have a count/length value less than 35, and image nodes 1120n, 1122n, and 1126n have non-NULL node pointers, while the last image node (image node 1130n) has a NULL node pointer. Further, the sum of the count/length values of image nodes 1120n, 1122n, 1126n, and 1130n is 35. These data points for image nodes 1120n, 1122n, 1126n, and 1130n indicate that indicate that image node 1120n, 1122n, 1126n, and 1130n collectively represent the 35-pixel-long Line 2 of image 1110.

When executing method 800, decoder 450 can initialize the RunSum value to 0 at block 810 and, for generation of image nodes 1140, RunTHR is initially set to 10. As RunSum is initially set to 0, decoder 450 will always take the YES branch at block 820 for the first line of an image, thus indicating that the first line of the image will always be encoded into one node when using blocks 830-852 of method 800, leading to generation of image node 1112n. Also, decoder 450 can determine that RunPixels=29 and RunSum=2 for the image parts 1112, 1114, 1116, and 1118 of Line 1.

Upon completion of Line 1, decoder 450 can then take the YES branch of block 880 to return to block 820. At block 820, decoder 450 can take the NO branch since RunPixels/ RunSum=14.5 is greater than RunTHR=10. Then, as the NO branch was taken at block 820, decoder 450 can convert image parts 1120-1130 for Line 2 of image 1110 into four image nodes 1120n, 1122n, 1126n, and 1130n using blocks 860-874 of method 800. Upon finishing the conversion of Line 2 of image 1110, decoder 450 can then take the NO branch of block 880 to terminate method 800.

Example Methods of Operation

Figure 12:
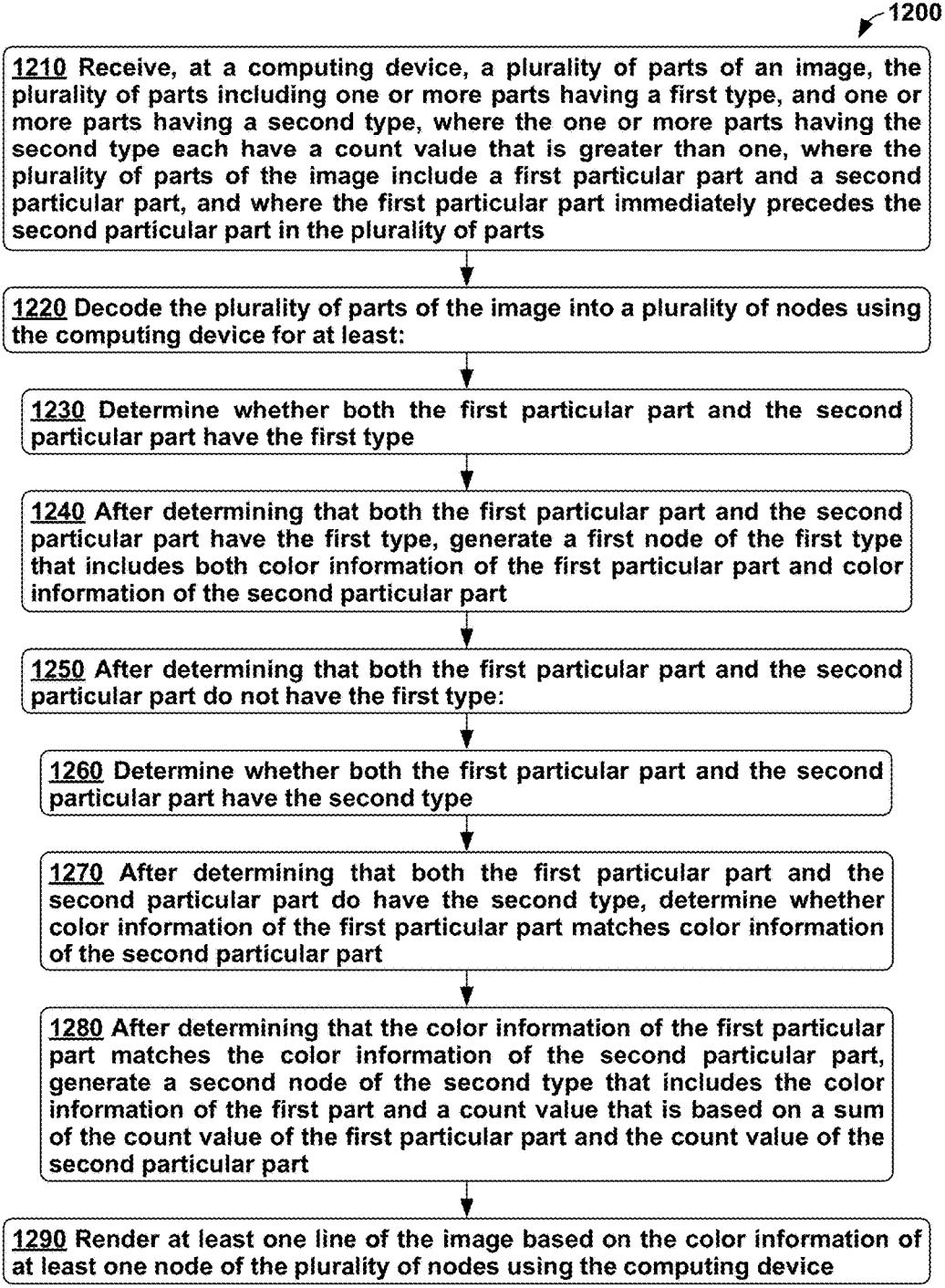
FIG. 12 shows a flowchart for yet another method, according to an example embodiment.

FIG. 12 shows a flowchart for method 1200, according to an example embodiment. Method 1200 can be carried out by a computing device, such as computing device 200. Method 1200 can begin at block 1210, where the computing device can receive a plurality of parts of an image. The plurality of parts can include one or more parts having a first type, and one or more parts having a second type. The one or more parts having the second type can each have a count value that is greater than one. The plurality of parts of the image can include a first particular part and a second particular part, and where the first particular part immediately precedes the second particular part in the plurality of parts, such as discussed above in the context of at least FIGS. 4A-11. For example, the one or more parts having the first type can be direct color parts, and the one or more parts having the second type can be repeated color parts.

At block 1220, where the computing device can decode the plurality of parts of the image into a plurality of nodes by at least carrying out the procedures of blocks 1230 through 1280, such as discussed above in the context of at least FIGS. 7 and 8.

At block 1230, the computing device can determine whether both the first particular part and the second particular part have the first type, such as discussed above in the context of at least FIGS. 7 and 8.

At block 1240, the computing device can, after determining that both the first particular part and the second particular part have the first type, generating a first node of the first type that includes both color information of the first particular part and color information of the second particular part, such as discussed above in the context of at least FIGS. 7 and 8.

In some embodiments, color information of each of the one or more parts having the first type can include color information for a plurality of pixels of the image, where color information of each of the one or more parts having the second type includes color information for a single pixel of the image, such as discussed above in the context of at least FIGS. 4D, 7-10B, and 11.

At block 1250, the computing device can, after determining that both the first particular part and the second particular part do not have the first type, carry out the procedures of blocks 1260 through 1280, such as discussed above in the context of at least FIGS. 7 and 8.

At block 1260, the computing device can determine whether both the first particular part and the second particular part have the second type, such as discussed above in the context of at least FIGS. 7 and 8.

At block 1270, the computing device can, after determining that both the first particular part and the second particular part do have the second type, determine whether color information of the first particular part matches color information of the second particular part, such as discussed above in the context of at least FIGS. 7 and 8.

At block 1280, the computing device can, after determining that the color information of the first particular part matches the color information of the second particular part, generate a second node of the second type that includes the color information of the first part and a count value that is based on a sum of the count value of the first particular part and the count value of the second particular part, such as discussed above in the context of at least FIGS. 7 and 8.

In some embodiments, the plurality of parts of the image can further include a third particular part and a fourth particular part, where the third particular part immediately precedes the fourth particular part in the plurality of parts. Then, decoding the plurality of parts of the image can further include: determining whether the fourth particular part of the plurality of parts has the second type; after determining that the fourth particular part of the plurality of parts has the second type, determining whether the third particular part of the plurality of parts has the first type; and after determining that the third particular part of the plurality of parts has the first type, generating a third node having a count value that is based on the count value of the fourth particular node, such as discussed above in the context of at least FIGS. 7 and 8.

In other embodiments, the plurality of parts of the image can further include a third particular part and a fourth particular part, and where the third particular part immediately precedes the fourth particular part in the plurality of parts. Then, decoding the plurality of parts of the image can further include: determining whether the fourth particular part of the plurality of parts has the first type; after determining that the fourth particular part of the plurality of parts has the first type, determining whether the third particular part of the plurality of parts has the second type; and after determining that the third particular part of the plurality of parts has the second type, generating a fourth node having a buffer configured to store at least color information of the fourth particular part, such as discussed above in the context of at least FIGS. 7 and 8.

In still other embodiments, decoding the plurality of parts of the image can include allocating memory for a decoded version of the image, where an amount of the memory is based on a height of the image, a width of the image, and a destination color space number, such as discussed above in the context of at least FIG. 5.

At block 1290, the computing device can render at least one line of the image based on the color information of at least one node of the plurality of nodes, such as discussed above in the context of at least FIG. 9.

In some embodiments, the image can be associated with a horizontal scale factor. Then, rendering the at least one line of the image based on the color information of at least one node of the plurality of nodes can include: determining a third node associated with the at least one line of the image; determining whether the third node is of the second type; and after determining that the third node is of the second type, determining a copy count for the third node based on a product of the count value of the third node and horizontal scale factor; and making a number of copies of the color information from the third node into a line buffer for the at least one line of the image, where the number of copies is based on the copy count, such as discussed above in the context of at least FIG. 9.

In other embodiments, the image can be associated with a vertical scale factor. Then, rendering the at least one line of the image based on the color information of at least one node of the plurality of nodes can include: storing color information for the line of the image in a line buffer; and making a number of copies of the line buffer where the number of copies is based on the vertical scale factor, such as discussed above in the context of at least FIG. 9.

In some embodiments, method 1200 can further include: determining whether color conversion is to be performed on the plurality of parts of the image; and after determining that color conversion is to be performed on the plurality of parts of the image, generating the first node by at least: color-converting the color information of the first particular part; and storing at least the color-converted color information of the first particular part and the second particular part in a buffer associated with the first node, such as discussed above in the context of at least FIGS. 5 and 8.

In other embodiments, method 1200 can further include: determining whether color conversion is to be performed on the plurality of parts of the image; and after determining that color conversion is to be performed on the plurality of parts of the image, generating the second node by at least: color-converting the color information of the first particular part; and storing the color-converted color information of the first particular part with the second node, such as discussed above in the context of at least FIGS. 5 and 8.

In still other embodiments, the image can include a plurality of lines including a first line immediately followed by a second line, where the plurality of parts can include a first set of parts associated with the first line and a second set of parts associated with the second line. Then method 1200 can further include: determining an average count value of parts in the first set of parts that have the second type; determining whether the average count value of parts in the first set of parts is less than a pre-determined threshold count value; and after determining that the average count value of parts in the first set of parts is less than the pre-determined threshold count value: decoding the second set of parts into a color pixel buffer; and generating a node of the plurality of nodes for the color pixel buffer, such as discussed above in the context of at least FIG. 8.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
receiving, at a computing device, a plurality of parts of an image, the plurality of parts comprising one or more parts having a first type, and one or more parts having a second type, wherein the one or more parts having the second type each have a count value that is greater than one, wherein the plurality of parts of the image comprise a first particular part and a second particular part, and wherein the first particular part immediately precedes the second particular part in the plurality of parts;
decoding the plurality of parts of the image into a plurality of nodes using the computing device for at least:
 determining whether both the first particular part and the second particular part have the first type;
 after determining that both the first particular part and the second particular part have the first type, generating a first node of the first type that comprises both color information of the first particular part and color information of the second particular part; and
 after determining that both the first particular part and the second particular part do not have the first type:
  determining whether both the first particular part and the second particular part have the second type,
  after determining that both the first particular part and the second particular part do have the second type, determining whether color information of the first particular part matches color information of the second particular part, and
  after determining that the color information of the first particular part matches the color information of the second particular part, generating a second node of the second type that comprises the color information of the first part and a count value that is based on a sum of the count value of the first particular part and the count value of the second particular part; and
rendering at least one line of the image based on the color information of at least one node of the plurality of nodes using the computing device.

2. The method of claim 1, wherein the plurality of parts of the image further comprise a third particular part and a fourth particular part, and wherein the third particular part immediately precedes the fourth particular part in the plurality of parts, and wherein decoding the plurality of parts of the image further comprises:

determining whether the fourth particular part of the plurality of parts has the second type;

after determining that the fourth particular part of the plurality of parts has the second type, determining whether the third particular part of the plurality of parts has the first type; and after determining that the third particular part of the plurality of parts has the first type, generating a third node having a count value that is based on the count value of the fourth particular node.

3. The method of claim 1, wherein the plurality of parts of the image further comprise a third particular part and a fourth particular part, and wherein the third particular part immediately precedes the fourth particular part in the plurality of parts, and wherein decoding the plurality of parts of the image further comprises:

determining whether the fourth particular part of the plurality of parts has the first type;

after determining that the fourth particular part of the plurality of parts has the first type, determining whether the third particular part of the plurality of parts has the second type; and after determining that the third particular part of the plurality of parts has the second type, generating a fourth node having a buffer configured to store at least color information of the fourth particular part.

4. The method of claim 1, further comprising:

determining whether color conversion is to be performed on the plurality of parts of the image; and after determining that color conversion is to be performed on the plurality of parts of the image, generating the first node by at least:

color-converting the color information of the first particular part; and storing at least the color-converted color information of the first particular part and the second particular part in a buffer associated with the first node.

5. The method of claim 1, further comprising:

determining whether color conversion is to be performed on the plurality of parts of the image; and after determining that color conversion is to be performed on the plurality of parts of the image, generating the second node by at least:

color-converting the color information of the first particular part; and storing the color-converted color information of the first particular part with the second node.

6. The method of claim 1, wherein color information of each of the one or more parts having the first type comprises color information for a plurality of pixels of the image, and wherein color information of each of the one or more parts having the second type comprises color information for a single pixel of the image.

7. The method of claim 1, wherein decoding the plurality of parts of the image comprises allocating memory for a decoded version of the image, wherein an amount of the memory is based on a height of the image, a width of the image, and a destination color space number.

8. The method of claim 1, wherein the image comprises a plurality of lines comprising a first line immediately followed by a second line, wherein the plurality of parts comprises a first set of parts associated with the first line and a second set of parts associated with the second line, and wherein the method further comprises:

determining an average count value of parts in the first set of parts that have the second type;

determining whether the average count value of parts in the first set of parts is less than a pre-determined threshold count value; and after determining that the average count value of parts in the first set of parts is less than the pre-determined threshold count value:

decoding the second set of parts into a color pixel buffer; and generating a node of the plurality of nodes for the color pixel buffer.

9. The method of claim 1, wherein the image is associated with a horizontal scale factor, and wherein rendering the at least one line of the image based on the color information of at least one node of the plurality of nodes comprises:

determining a third node associated with the at least one line of the image;

determining whether the third node is of the second type; and after determining that the third node is of the second type, determining a copy count for the third node based on a product of the count value of the third node and horizontal scale factor; and making a number of copies of the color information from the third node into a line buffer for the at least one line of the image, wherein the number of copies is based on the copy count.

10. The method of claim 1, wherein the image is associated with a vertical scale factor, and wherein rendering the at least one line of the image based on the color information of at least one node of the plurality of nodes comprises:

storing color information for the line of the image in a line buffer; and making a number of copies of the line buffer wherein the number of copies is based on the vertical scale factor.

11. A computing device, comprising:

one or more processors; and data storage configured to store computer-readable instructions that, when executed by the one or more processors, cause the computing device to perform functions comprising:

receiving a plurality of parts of an image, the plurality of parts comprising one or more parts having a first type and one or more parts having a second type, wherein the one or more parts having the second type each have a positive count value, wherein the plurality of parts of the image comprise a first particular part and a second particular part, and wherein the first particular part immediately precedes the second particular part in the plurality of parts;

decoding the plurality of parts of the image into a plurality of nodes by at least:

determining whether both the first particular part and the second particular part have the first type;

after determining that both the first particular part and the second particular part have the first type, generating a first node of the first type that comprises color information of the first particular part and color information of the second particular part; and after determining that the both the first particular part and the second particular part do not have the first type:

determining whether both the first particular part and the second particular part have the second type, after determining that both the first particular part and the second particular part do have the second type, determining whether color information of the first particular part matches color information of the second particular part, and after determining that the color information of the first particular part matches the color information of the second particular part, generating a second node of the second type that comprises the color information of the first part and a count value based on a sum of the count value of the first particular part and the count value of the second particular part; and rendering at least one line of the image based on the color information of at least one node of the plurality of nodes.

12. The computing device of claim 11, wherein the plurality of parts of the image further comprise a third particular part and a fourth particular part, and wherein the third particular part immediately precedes the fourth particular part in the plurality of parts, and wherein decoding the plurality of parts of the image further comprises:

determining whether the fourth particular part of the plurality of parts has the second type;

after determining that the fourth particular part of the plurality of parts has the second type, determining whether the third particular part of the plurality of parts has the first type; and after determining that the third particular part of the plurality of parts has the first type, generating a third node having a count value that is based on the count value of the fourth particular node.

13. The computing device of claim 11, wherein the plurality of parts of the image further comprise a third particular part and a fourth particular part, and wherein the third particular part immediately precedes the fourth particular part in the plurality of parts, and wherein decoding the plurality of parts of the image further comprises:

determining whether the fourth particular part of the plurality of parts has the first type;

after determining that the fourth particular part of the plurality of parts has the first type, determining whether the third particular part of the plurality of parts has the second type; and after determining that the third particular part of the plurality of parts has the second type, generating a fourth node having a buffer configured to store at least color information of the fourth particular part.

14. The computing device of claim 11, further comprising:

determining whether color conversion is to be performed on the plurality of parts of the image; and after determining that color conversion is to be performed on the plurality of parts of the image, generating the first node by at least:

color-converting the color information of the first particular part; and storing at least the color-converted color information of the first particular part and the second particular part in a buffer associated with the first node.

15. The computing device of claim 11, further comprising:

determining whether color conversion is to be performed on the plurality of parts of the image; and after determining that color conversion is to be performed on the plurality of parts of the image, generating the second node by at least:

color-converting the color information of the first particular part; and storing the color-converted color information of the first particular part with the second node.

16. The computing device of claim 11, wherein color information of each of the one or more parts having the first type comprises color information for a plurality of pixels of the image, and wherein color information of each of the one or more parts having the second type comprises color information for a single pixel of the image.

17. The computing device of claim 11, wherein decoding the plurality of parts of the image comprises allocating memory for a decoded version of the image, wherein an amount of the memory is based on a height of the image, a width of the image, and a destination color space number.

18. The computing device of claim 11, wherein the image comprises a plurality of lines comprising a first line immediately followed by a second line, wherein the plurality of parts comprises a first set of parts associated with the first line and a second set of parts associated with the second line, and wherein the functions further comprise:

determining an average count value of parts in the first set of parts that have the second type;

determining whether the average count value of parts in the first set of parts is less than a pre-determined threshold count value; and after determining that the average count value of parts in the first set of parts is less than the pre-determined threshold count value:

decoding the second set of parts into a color pixel buffer; and generating a node of the plurality of nodes for the color pixel buffer.

19. The computing device of claim 11, wherein the image is associated with a horizontal scale factor and a vertical scale factor, and wherein rendering the at least one line of the image based on the color information of at least one node of the plurality of nodes comprises:

determining a third node associated with the at least one line of the image;

determining whether the third node is of the second type; and after determining that the third node is of the second type, determining a copy count for the third node based on a product of the count value of the third node and horizontal scale factor; and making a number of copies of the color information from the third node into a line buffer for the at least one line of the image, wherein the number of copies is based on the copy count.

20. An article of manufacture comprising non-transitory data storage storing at least computer-readable instructions that, when executed by one or more processors of a computing device, cause the computing device to perform functions comprising:

receiving a plurality of parts of an image, the plurality of parts comprising one or more parts having a first type and one or more parts having a second type, wherein the one or more parts having the second type each have a positive count value, wherein the plurality of parts of the image comprise a first particular part and a second particular part, and wherein the first particular part immediately precedes the second particular part in the plurality of parts;

decoding the plurality of parts of the image into a plurality of nodes by at least:

determining whether both the first particular part and the second particular part have the first type;

after determining that both the first particular part and the second particular part have the first type, generating a first node of the first type that comprises color information of the first particular part and color information of the second particular part; and after determining that both the first particular part and the second particular part do not have the first type:
   determining whether both the first particular part and the second particular part have the second type,
   after determining that both the first particular part and the second particular part do have the second type, determining whether color information of the first particular part matches color information of the second particular part, and
   after determining that the color information of the first particular part matches the color information of the second particular part, generating a second node of the second type that comprises the color information of the first part and a count value based on a sum of the count value of the first particular part and the count value of the second particular part; and rendering at least one line of the image based on the color information of at least one node of the plurality of nodes.

* * * * *